United States Patent
Jang et al.

(10) Patent No.: US 11,895,571 B2
(45) Date of Patent: Feb. 6, 2024

(54) ELECTRONIC DEVICE TRANSMITTING AND/OR RECEIVING PACKET THROUGH NETWORK SLICE AND METHOD FOR OPERATING THE SAME

(71) Applicant: SAMSUNG ELECTRONICS CO., LTD., Suwon-si (KR)

(72) Inventors: Jaewon Jang, Suwon-si (KR); Ansik Shin, Suwon-si (KR); Hyunsang Park, Suwon-si (KR); Sungki Suh, Suwon-si (KR); Milim Lee, Suwon-si (KR); Wonbo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 17/701,451

(22) Filed: Mar. 22, 2022

(65) Prior Publication Data
US 2022/0322199 A1 Oct. 6, 2022

Related U.S. Application Data

(63) Continuation of application No. PCT/KR2022/003173, filed on Mar. 7, 2022.

(30) Foreign Application Priority Data

Apr. 6, 2021 (KR) .................. 10-2021-0044381

(51) Int. Cl.
*H04W 28/02* (2009.01)
*H04W 40/02* (2009.01)
(Continued)

(52) U.S. Cl.
CPC ............. *H04W 40/02* (2013.01); *H04L 69/22* (2013.01); *H04W 28/02* (2013.01); *H04W 76/10* (2018.02); *H04W 80/04* (2013.01); *H04W 80/06* (2013.01)

(58) Field of Classification Search
CPC ..... H04W 40/02; H04W 28/02; H04W 76/10; H04W 80/04; H04W 80/06; H04L 69/22
See application file for complete search history.

(56) References Cited

U.S. PATENT DOCUMENTS

2014/0003358 A1* 1/2014 Elliott ............... H04W 72/0446
370/329
2015/0350071 A1 12/2015 Pauly et al.
(Continued)

FOREIGN PATENT DOCUMENTS

KR 10-2011-0068700 6/2011
KR 10-2011-0071823 6/2011
(Continued)

OTHER PUBLICATIONS

Policy and Charging control framework for the 5G System (SGS), 3GPP TS 23.503, Jun. 1, 2021, pp. 1-137.
(Continued)

*Primary Examiner* — Lakeram Jangbahadur
(74) *Attorney, Agent, or Firm* — Nixon & Vanderhye, P.C.

(57) ABSTRACT

According to various embodiments, an electronic device may comprise: at least one processor and at least one communication processor. The at least one processor may be configured to: obtain a user equipment (UE) route selection policy (URSP) rule including a first traffic descriptor including a first IP address and a first route selection descriptor corresponding to the first traffic descriptor and request the at least one communication processor to establish a first PDU session corresponding to the first route selection descriptor. The at least one communication processor may be configured to: establish the first PDU session corresponding to the first route selection descriptor in response to the request to establish the first PDU session. A first network interface corresponding to the first PDU session may be established
(Continued)

between the at least one communication processor and the at least one processor. The at least one processor may be configured to identify transmission data from an application executed by the at least one processor, request the at least one communication processor to transmit a first transmission packet including a first source IP address corresponding to the first network interface and the transmission data, through the first network interface, based on a destination IP address corresponding to the transmission data corresponding to the first IP address, and request the at least one communication processor to transmit a second transmission packet including a second source IP address corresponding to a second network interface, different from the first network interface, and the transmission data, through the second network interface, based on the destination IP address corresponding to the transmission data not corresponding to the first IP address.

20 Claims, 24 Drawing Sheets

(51) Int. Cl.
  *H04W 76/10* (2018.01)
  *H04L 69/22* (2022.01)
  *H04W 80/04* (2009.01)
  *H04W 80/06* (2009.01)

(56) References Cited

U.S. PATENT DOCUMENTS

| | | | |
|---|---|---|---|
| 2018/0324646 A1* | 11/2018 | Lee | H04W 36/0016 |
| 2019/0313236 A1 | 10/2019 | Lee et al. | |
| 2020/0053622 A1* | 2/2020 | Huang-Fu | H04W 76/11 |
| 2020/0053806 A1* | 2/2020 | Han | H04W 76/15 |
| 2020/0382605 A1 | 12/2020 | Ouyang et al. | |
| 2021/0037380 A1* | 2/2021 | Lee | H04W 28/02 |
| 2021/0219221 A1 | 7/2021 | Li et al. | |
| 2021/0400146 A1 | 12/2021 | Munoz De La Torre Alonso et al. | |
| 2022/0278935 A1* | 9/2022 | Vemuri | H04L 47/2408 |
| 2023/0097726 A1* | 3/2023 | Park | H04L 45/38 370/392 |

FOREIGN PATENT DOCUMENTS

| | | |
|---|---|---|
| KR | 10-2018-0123364 | 11/2018 |
| KR | 10-2019-0118072 | 10/2019 |
| KR | 10-2020-0017297 | 2/2020 |
| KR | 10-2020-0118204 | 10/2020 |
| KR | 10-2021-0073565 | 6/2021 |
| KR | 10-2023-0003519 | 1/2023 |
| KR | 10-2023-0034114 | 3/2023 |
| WO | 2019/194633 | 10/2019 |
| WO | 2020/030180 | 2/2020 |

OTHER PUBLICATIONS

Search Report and Written Opinion dated Jun. 9, 2022 in counterpart International Patent Application No. PCT/KR2022/003173.
Mediatek Inc., "Removal of editor's notes for URSP related capability indications," C1-205284, 3GPP TSG-CT WG1 Meeting #125-e, E-Meeting, Aug. 27, pp. 3-6.
"5G; UE policies for 5G system (5GS); Stage 3," (3GPP TS 24.526 version 15.4.0 Release 15), ETSI TS 124 526 V15.4.0, Jan. 1, 2021, pp. 7-10.

* cited by examiner

ELECTRONIC DEVICE TRANSMITTING AND/OR RECEIVING PACKET THROUGH NETWORK SLICE AND METHOD FOR OPERATING THE SAME

CROSS-REFERENCE TO RELATED APPLICATIONS

This application is a continuation of International Application No. PCT/KR2022/003173, designating the United States, filed on Mar. 7, 2022, in the Korean Intellectual Property Receiving Office and claiming priority to Korean Patent Application No. 10-2021-0044381, filed on Apr. 6, 2021, in the Korean Intellectual Property Office, the disclosures of which are incorporated by reference herein in their entireties.

BACKGROUND

Field

The disclosure relates to an electronic device that transmits and/or receives a packet through a network slice and a method for operating the same.

Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MTMO), array antenna, an analog beam forming, large scale antenna techniques are discussed in 5G communication systems.

A prominent feature of 5G networks lies in adopting network slicing for radio access networks (RANs) and core networks (CNs). This is intended for bundling up network resources and network functions into a single independent network slice depending on individual services, allowing for application of network system function and resource isolation, customization, independent management and orchestration to mobile communication network architectures. The use of such network slicing enables offering 50 services in an independent and flexible way by selecting and combining 5G system network functions according to services, users, business models, or such references.

The 3rd generation partnership project (3GPP) defines user equipment (UE) route selection policy (URSP) rules. A UE may receive a URSP rule from a policy control function (PCF) and form a data session with a network slice. The URSP rule may include a traffic descriptor and a route selection descriptor. The traffic descriptor may include an application descriptor.

The 3GPP standard discloses the application descriptor, the Internet protocol (IP) descriptor, the domain descriptor, the non-IP descriptor, the data network (DNN), and connection capabilities, as example descriptors. Currently, if a network connection request from a specific application is identified, the electronic device identifies an application descriptor (e.g., OSID and/or OSAppID) corresponding to the specific application and establishes a protocol data unit (PDU) session using the route selection descriptor corresponding thereto. However, there is no disclosure regarding a scheme for processing the IP descriptor or the domain descriptor.

SUMMARY

According to various embodiments, an electronic device and an operation method thereof may establish a PDU session corresponding to a specific IP descriptor and/or a domain descriptor and may transmit and/or receive packets through the established PDU session if an IP address corresponding to the specific IP descriptor and/or domain descriptor is identified.

According to various example embodiments, an electronic device may comprise: at least one processor and at least one communication processor. The at least one processor may be configured to: obtain a user equipment (UE) route selection policy (URSP) rule including a first traffic descriptor including a first IP address and a first route selection descriptor corresponding to the first traffic descriptor and request the at least one communication processor to establish a first protocol data unit (PDU) session corresponding to the first route selection descriptor. The at least one communication processor may be configured to: establish the first PDU session corresponding to the first route selection descriptor in response to the request to establish the first PDU session. A first network interface corresponding to the first PDU session may be established between the at least one communication processor and the at least one processor. The at least one processor may be further configured to: identify transmission data from an application executed by the at least one processor, request the at least one communication processor to transmit a first transmission packet including a first source IP address corresponding to the first network interface and the transmission data, through the first network interface, based on a destination IP address corresponding to the transmission data corresponding to the first IP address, and request the at least one communication processor to transmit a second transmission packet including a second source IP address corresponding to a second network interface, different from the first network interface, and the transmission data, through the second network interface, based on the destination IP address corresponding to the transmission data not corresponding to the first IP address.

According to various example embodiments, a method for operating an electronic device including at least one processor and at least one communication processor may comprise: obtaining, by the at least one processor, a URSP rule including a first traffic descriptor including a first IP address and a first route selection descriptor corresponding to the first traffic descriptor and requesting, by the at least one processor, the at least one communication processor to establish a first PDU session corresponding to the first route selection descriptor. The at least one communication processor may establish the first PDU session corresponding to the first route selection descriptor in response to the request to establish the first PDU session. A first network interface corresponding to the first PDU session may be established between the at least one communication processor and the at least one processor. The method for operating the electronic device may further comprise: identifying, by the at least one processor, transmission data from an application executed by the at least one processor, requesting, by the at least one processor, the at least one communication processor to transmit a first transmission packet including a first source IP address corresponding to the first network interface and the transmission data, through the first network interface, based on a destination IP address corresponding to the transmission data corresponding to the first IP address, and requesting, by the at least one processor, the at least one communication processor to transmit a second transmission packet including a second source IP address corresponding to a second network interface, different from the first network interface, and the transmission data, through the second network interface, based on the destination IP address corresponding to the transmission data not corresponding to the first IP address.

According to various example embodiments, there may be provided an electronic device and an operation method thereof that may establish a PDU session corresponding to a specific IP descriptor and/or a domain descriptor and may transmit and/or receive packets through the established PDU session if an IP address corresponding to the specific IP descriptor and/or domain descriptor is identified. According to various example embodiments, there may be provided an electronic device and an operation method thereof that may identify an IP address by sending a query for a domain descriptor to a domain name server (DNS), identify an IP address, and transmit and/or receive packets through an established PDU session if the IP address is identified. Accordingly, it may be possible to transmit and/or receive packets using the IP descriptor and/or the domain descriptor.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
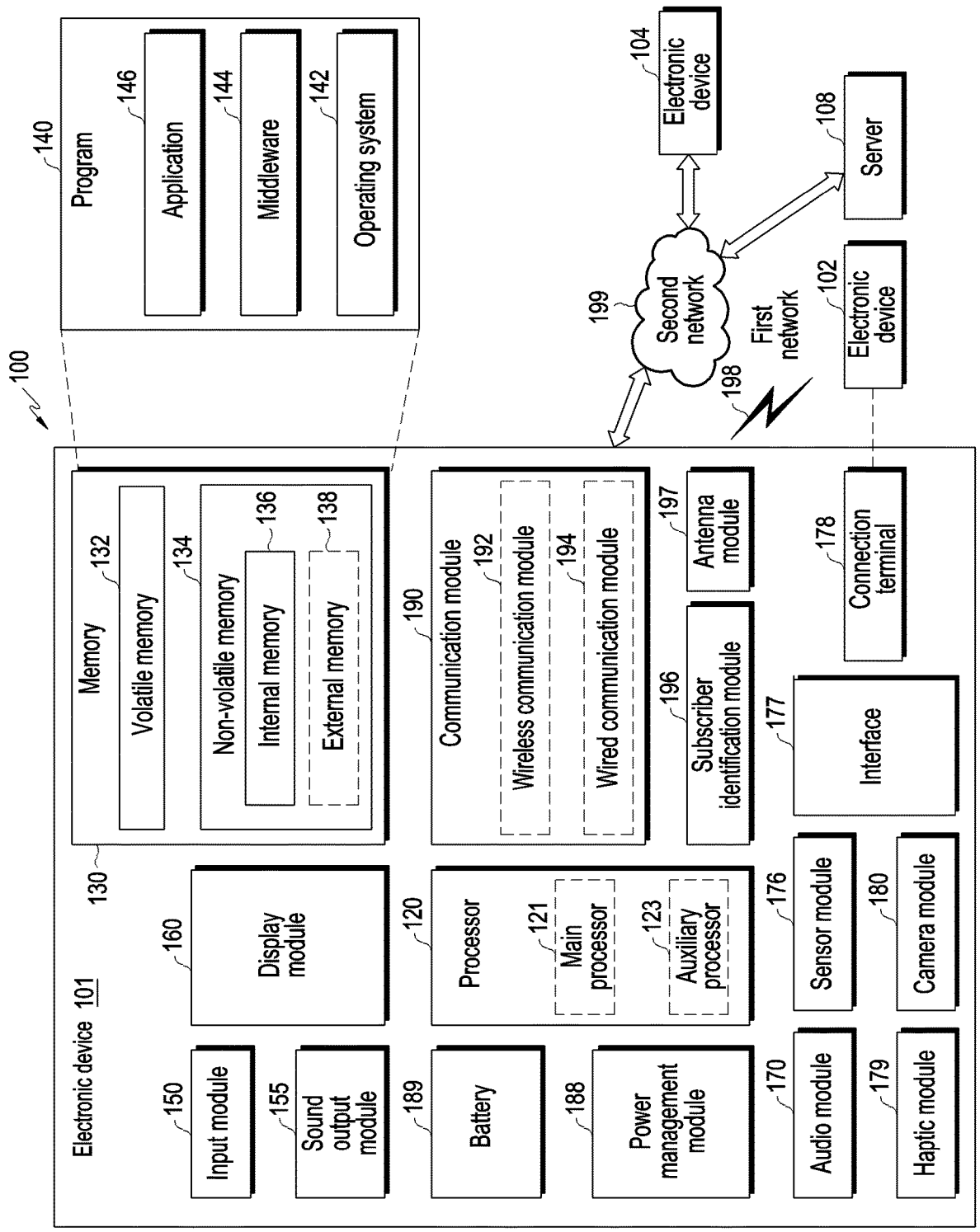
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC, or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
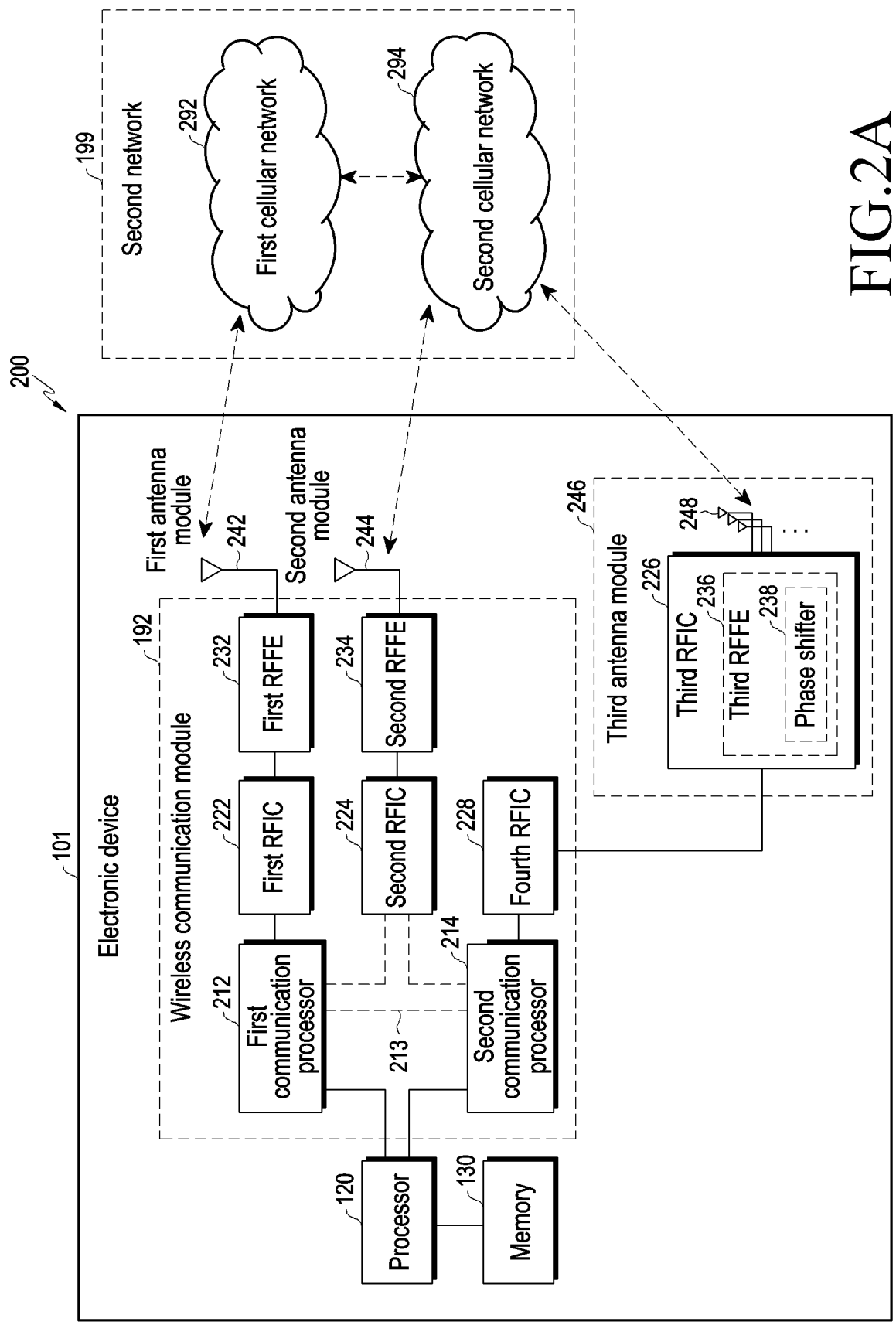
FIG. 2A is a block diagram illustrating an example electronic device for supporting legacy network communication and 5G network communication according to various embodiments.

FIG. 2A is a block diagram 200 illustrating an example of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor (CP) 212 may include various processing circuitry and establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may include various processing circuitry and establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package.

Figure 2B:
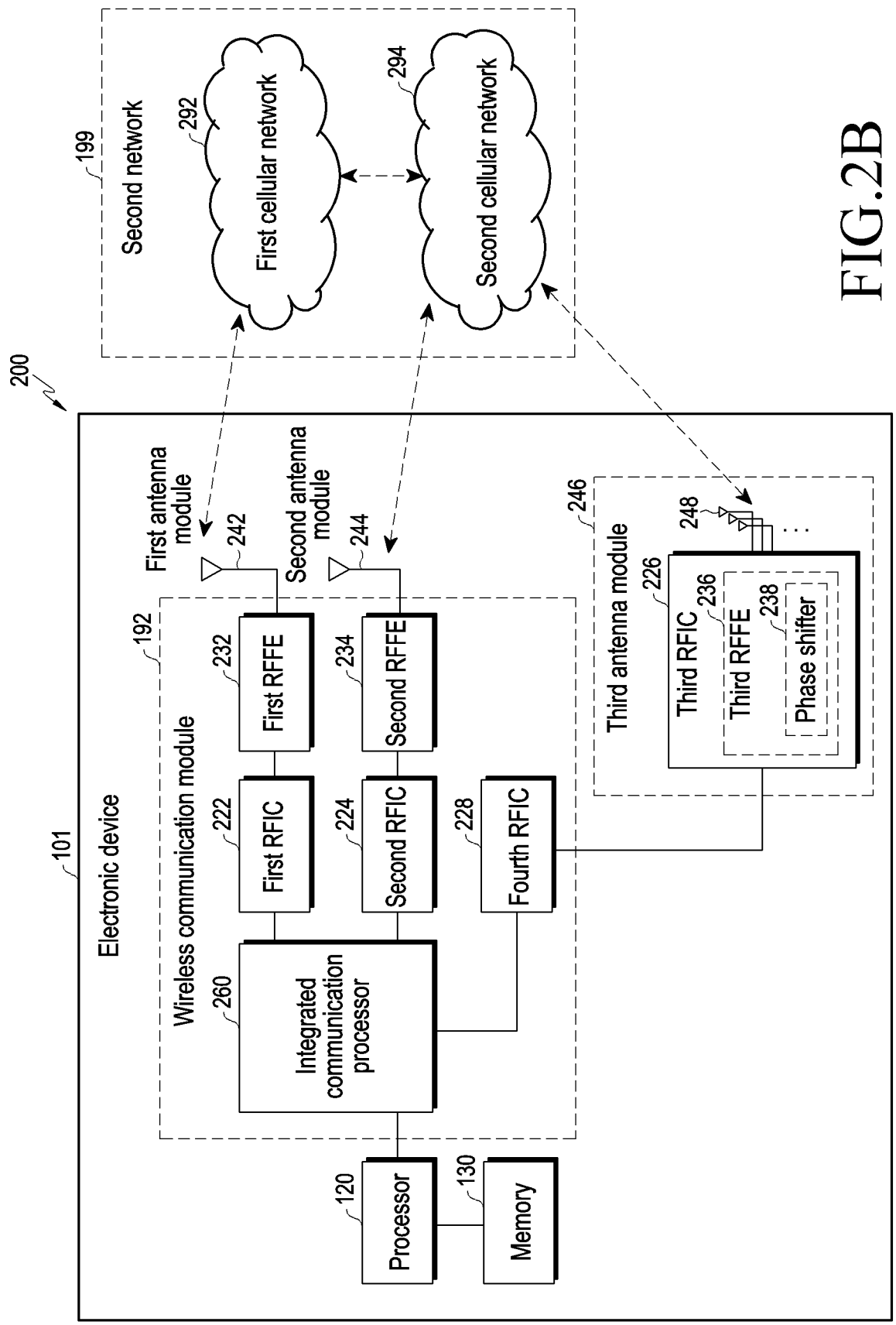
FIG. 2B is a block diagram illustrating an example electronic device for supporting legacy network communication and 5G network communication according to various embodiments.

According to an embodiment, the first communication processor 212 or the second communication processor 214, along with the processor 120, an assistance processor 123, or communication module 190, may be formed in a single chip or single package. For example, as shown in FIG. 2B, in integrated communication processor (e.g., including processing circuitry) 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 60 Hz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 60 Hz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Meanwhile, the processor 120 and the communication processor e. g. at least one of the first communication processor 212, the second communication processor 214, or the unified communication processor 260 may be implemented as at least one integrated circuit, and in this case, it may include at least one storage circuit for storing at least one instruction for causing at least one operation to be performed according to various embodiments, and at least one processing circuit for executing the at least one instruction.

As used herein, terms for identifying access nodes, terms denoting network entities, terms denoting messages, terms denoting inter-network entity interfaces, and terms denoting various pieces of identification information are provided as an example for ease of description. For ease of description, various embodiments of the disclosure adopt terms and names defined in 5G system standards. However, the disclosure is not limited by such terms and names and may be likewise applicable to systems conforming to other standards. The description of embodiments of the disclosure focuses primarily on 3GPP communication standards, but the subject matter of the disclosure may also be applicable to other communication systems with a similar technical background with minor changes without significantly departing from the scope of the present disclosure, and this may be so performed by the determination of those skilled in the art to which the present disclosure pertains.

General communication systems have been designed independently from applications provided on the communication systems. The user accesses the communication system and then selects an application which the user intends to use and receives service. With the development of network function virtualization (NFV), software defined network (SDN) or such techniques, communication technology evolves to be able to configure a network slice optimized for the nature of each application over a single huge network.

A network slice may be configured of an end-to-end (E2E) logical network including an electronic device 101 and an opposite node (an opposite electronic device or an opposite application server).

The user may access a network specified for the application which the user is using and receive a service. For example, the user's UE may simultaneously access one or more network slices.

The 3GPP which is in charge of mobile communication standardization has completed the 5G phase I standard which encompasses network slicing functions. Rel-16 goes on with the network slicing phase II standard.

Figure 3A:
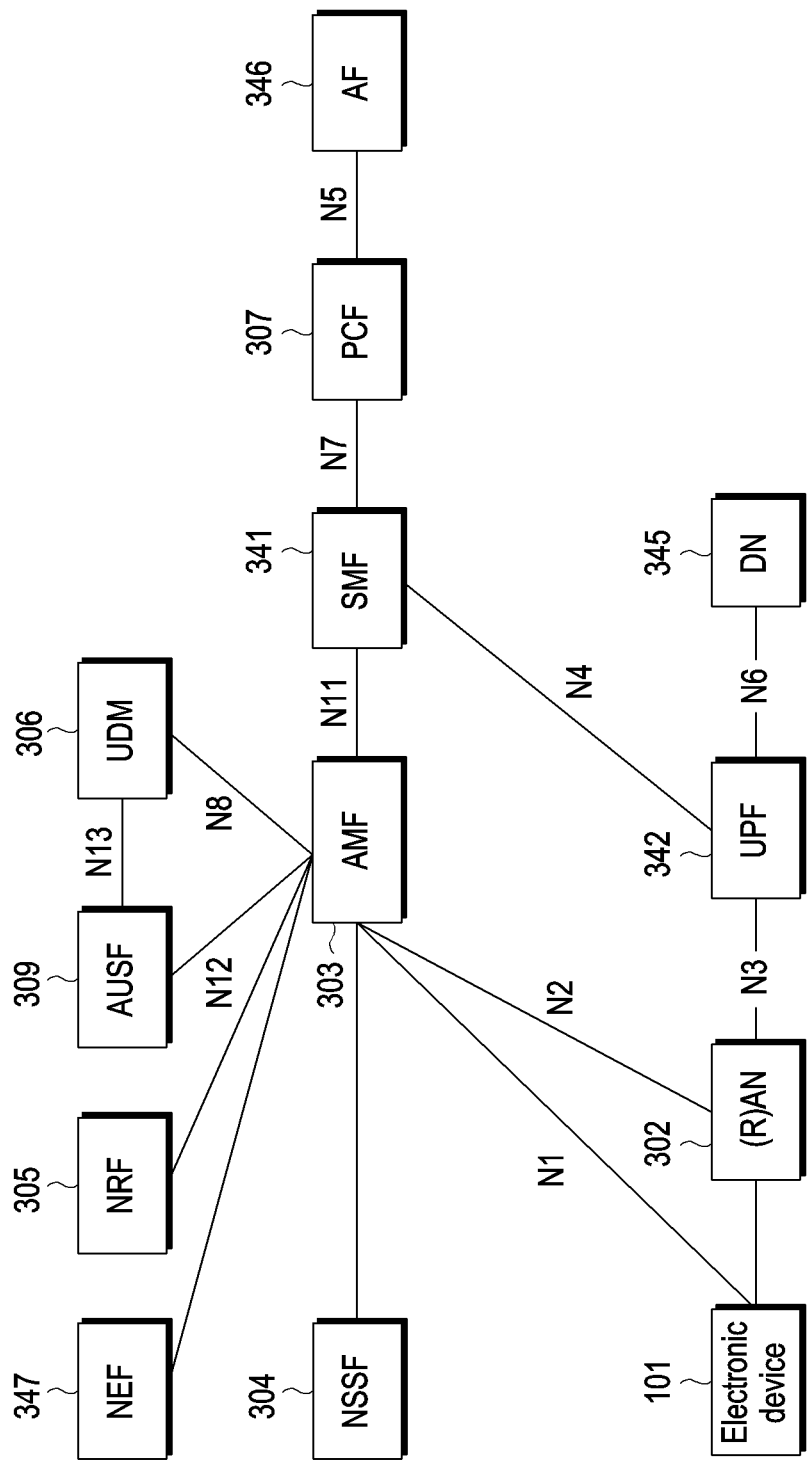
FIG. 3A illustrates a an example 5G system structure according to various embodiments.
Figure 3B:
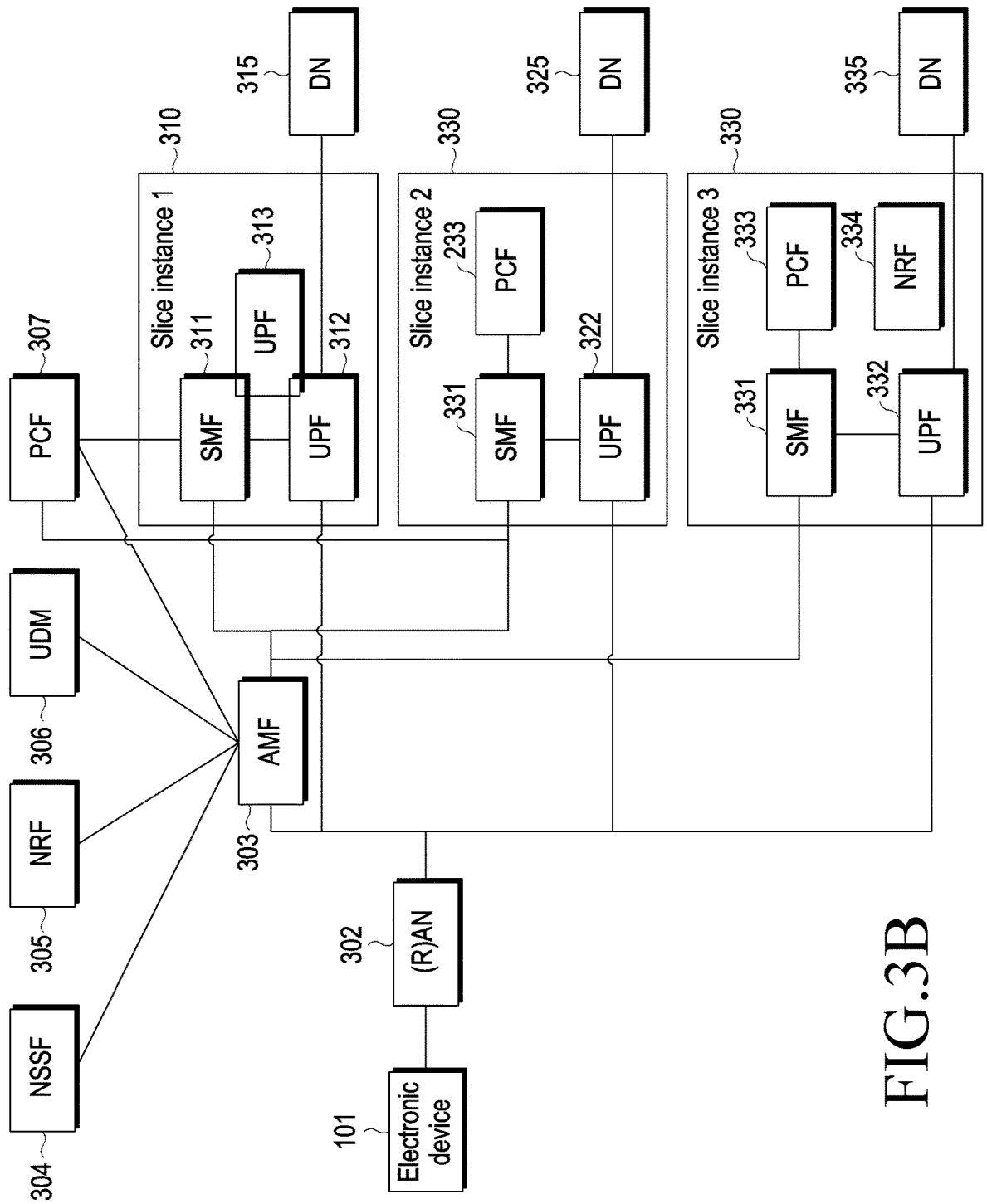
FIG. 3B illustrates an example 5G network slice structure according to various embodiments.

FIG. 3A illustrates a 5G system structure according to various embodiments. FIG. 3B illustrates a 5G network slice structure according to various embodiments. Hereinafter, the overall 5G system is described and network slices are described with reference to FIGS. 3A and 3B.

Referring to FIG. 3A, a 5G system structure may include, as network elements, an electronic device 101 (e.g., a user equipment (UE)), a radio access network ((R)AN) 302, a data network (DN) 345, and a plurality of network functions (NFs) inside a core network (CN).

In the 5G system architecture, functions, connection points, or protocols may be defined for the plurality of NFs. The 5G system structure may be shown with reference points indicating service-based interfaces corresponding to the NFs and reference points indicating interactions present among the NFs.

The plurality of network functions (NFs) may include an authentication server function (AUSF) 309, an access and mobility management function (AMF) 303, a network exposure function (NEF) 347, a network function repository function (NRF) 305, a policy control function (PCF) 307, a session management function (SMF) 341, a unified data management (UDM) 306, a user plane function (UPF) 342, an application function (AF) 346, and a network slice selection function (NSSF) 304.

According to various embodiments of the disclosure, the AMF, SMF, PCF, and UPF may play a key role in establishing a UE-requested protocol data unit (PDU) session and managing traffic between the UE and the DN.

The reference point between the electronic device 101 and the AMF 303 is defined as N1.

The (R)AN 302 may represent a base station that uses radio access technology (RAT). For example, the AN 302 may be a base station with 3GPP access technology or a base station with non-3GPP access technology, such as Wi-Fi. The reference point between the AN 302 and the AMF 303 is defined as N2, and the reference point between the AN and the UPF 342 is defined as N3.

The DN 345 may deliver PDUs, which are to be sent on downlink, to the UPF 342 or receive PDUs from the electronic device 101 via the UPF 342. The reference point between the DN 345 and the UPF 342 is defined as N6.

The AMF 303 may provide access and mobility management functionality independently of access technology, e.g., per electronic device 101. The reference point between the AMF 303 and the electronic device 101 is defined as N1. The reference point between the AMF 303 and the (R)AN 302 is defined as N2. The reference point between the AMF 303 and the UDM 306 is defined as N8. The reference point between the AMF 303 and the AUSF 309 is defined as N12. The reference point between the AMF 303 and the SMF 341 is defined as N11.

The SMF 341 may provide session management functionality in which, where one electronic device 101 has several sessions, a different SMF is assigned per session to manage the sessions. The UPF 342 is set up using control signal information produced by the SMF 341. The N4 reference point is defined for the UPF 342 to be able to report its state to the SMF 341. The reference point between the SMF 341 and the AMF 303 is defined as N11, the reference point between the SMF 341 and the UDM 306 is defined as N10, the reference point between the SMF 341 and the PCF 305 is defined as N7, and the reference point between the SMF 341 and the AMF 303 is defined as N11.

For example, each electronic device 101 may connect to one AMF 303. For the SMF 341, one electronic device 101 may establish several sessions, and thus, a different SMF 311, 321, or 331 may be provided for each session.

To ensure quality of service (QoS), the AF 346 may provide information about packet flow to the PCF 307 which is in charge of policy control.

The PCF 307 may determine policy, e.g., session management or mobility management, based on the packet flow-related information for ensuring QoS and transfer it to the AMF 303 or SMF 341, thereby enabling at least one of proper mobility management, session management, or QoS management. The reference point between the AF 346 and the PCF 307 is defined as N5.

The AUSF 309 may store data for authenticating the electronic device 101.

The UDM 306 may store at least part of the users subscription data and policy data. The reference point between the AUSF 309 and the UDM 306 is defined as N13, the reference point between the AUSF 309 and the AMF 303 is defined as N12, the reference point between the UDM 306 and the AMF 303 is defined as N8, and the reference point between the UDM 306 and the SMF 341 is defined as N10.

The CP functions may include various functions to control the network and UE. As two representative functions, the electronic device 101, the (R)AN 302, the UPF 342, the AMF 303, the AF 346, and the DN 345 in charge of mobility management functionality and the SMF 341 in charge of session management functionality are two independent functions and they may be included in the CP functions.

In describing embodiments of the disclosure, the terms "slice," "service," "network slice," "network service," "application slice," and "application service" may interchangeably be used.

The mobile communication service carrier may assign network resources suited for the corresponding service per slice or per set of a particular slice. The network resources may refer, for example, to at least one of network functions (NFs) or logical resources or radio resource allocations provided by the network functions (NFs).

Network slicing may refer, for example, to a technology to allow for application of at least one property among network isolation, customization, and independent management and orchestration to mobile communication core network architecture by bundling network resources and network functions into a single independent slice depending on the service.

Network slicing is a new concept for 50 core networks. Network slicing is technology which bundles network resources and network functions necessary for the service requested by the UE into a single independent slice.

By network slicing, the network service provider may make independent allocations of network resources specified for each service and user and secure the flexibility of network by software defined network (SDN) and network function virtualization (NFV)-based resource virtualization and hence expandability and reliability of service and network resource operation.

The public land mobile network (PLMN) may provide several network slices, and each network slice may be provided to the UE in the form of a slice instance. For example, the PLMN may include slice instance 1 310, slice instance 2 320, and slice instance 3 330.

The electronic device 101 may access the network to receive a service from at least one of the several slice instances simultaneously or sequentially.

Each slice instance may include network resources necessary to provide the corresponding network slice. For example, slice instance 1 310 may include an SMF 311 and UPFs 312 and 313, slice instance 2 320 may include an SMF 321, a UPF 322, and a PCF 323, and slice instance 3 330 may include an SMF 331, a UPF 332, a PCF 333, and an NRF 334.

Referring to FIGS. 3A and 3B, the SMF 321 of slice instance 2 320 may be connected to a PCF 307 of PLMN level and the PCF 323 of slice level. The PCF 307 of PLMN level may manage policy information about the PLMN level and provide it to the SMF 321. The PCF 323 of slice level which belongs to slice instance 2 may manage the policy required to provide the corresponding slice and provide the corresponding information to the SMF 321.

Each slice may be identified with a slice identity (ID). As an example, the slice ID may be single-network slice selection assistance information (S-NSSAI) defined by the 3GPP. According to various embodiments, the electronic device 101 may store configured network slice selection assistance information (NSSAI) and network slice selection policy (NSSP)-related information. The configured NSSAI may be configured of an S-NSSAI list for network slices of subscription to the home PLMN (HPLMN) by the electronic device 101. The S-NSSAI list may include at least one S-NSSAI #id. For example, the S-NSSAI list may include S-NSSAI #a, S-NSSAI #b, S-NSSAI #c, and S-NSSAI #d. Since the configured NSSAI is determined based on the electronic device 101's subscription information, the S-NSSAI of the configured NSSAI may differ per electronic device 101. Further, since the configured NSSAI is determined based on the subscription information for the electronic device 101, if the subscription information for the electronic device 101 is changed, the configured NSSAI stored in the electronic device 101 may also be changed. The S-NSSAI list subscribed to by the electronic device 101 of the configured NSSAI may be stored in the integrated UDM 306 storing subscription information for the electronic device 101. The S-NSSAI subscribed to by the electronic device 101 stored in the UDM 306 may be referred to as 'subscribed S-NSSAI'. The NSSP 101 represents mapping information between the electronic device 101-subscribed S-NSSAI (S-NSSAI #id) and the application which the corresponding S-NSSAI may support. One S-NSSAI #id may be mapped to at least one application. For example, S-NSSAI #a may be mapped to App #1 and App #2, S-NSSAI #b to App #1, S-NSSAI #c to App #3, and S-NSSAI # to all applications supportable. The NSSP may be stored in the policy control function (PCF) storing the electronic device 101 and network-related policy information. Or, the NSSP may be stored in the user data repository (UDR), and the PCF may, as necessary, send a request for NSSP information to the UDR and obtain the NSSP information from the UDR. When the subscription information for the electronic device 101 varies, a variation may be made to the electronic device 101 subscribed S-NSSAI information stored in the UDM 306. When the subscription information for the electronic device 101 varies, the NSSP information stored in the PCF or UDR may be varied. If at least one of subscribed S-NSSAI or NSSP varies, the relevant configuration information stored in the electronic device 101 need update.

Figure 4:
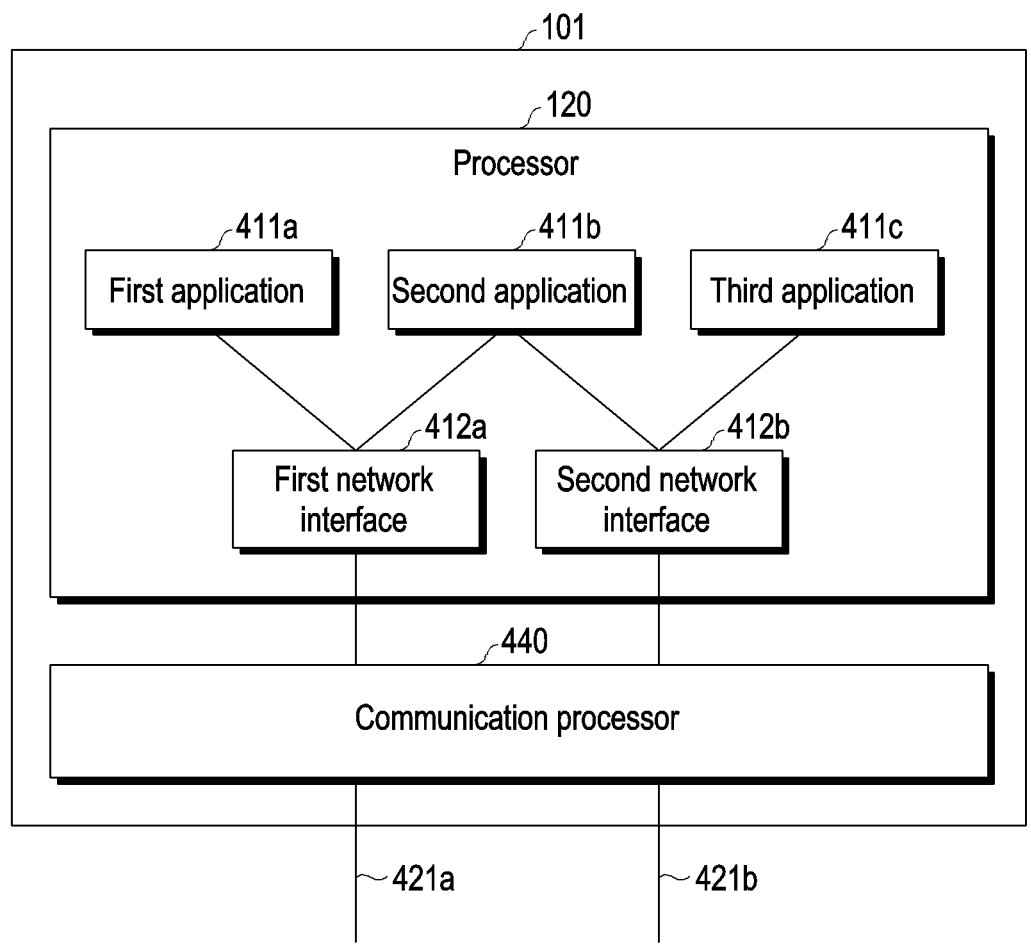
FIG. 4 is a block diagram illustrating an example electronic device according to various embodiments.

FIG. 4 is a block diagram illustrating an example electronic device according to various embodiments.

According to various embodiments, at least one of a first application 411a, a second application 411b, and/or a third application 411c may be executed on the processor 120. For example, the first application 411a, the second application 411b, and the third application 411c may be applications associated with a DNN of the Internet. For example, the first application 411a may be associated with a first IP address (or a first FQDN), and the third application 411c may be associated with a second IP address (or a second FQDN). For example, the first application 411a may be a dedicated application created by a first service provider, e.g., to interact with a server operated by the first service provider. The server operated by the first service provider may correspond to the first IP address (or the first FQDN). For example, the third application 411c may be a dedicated application created by a second service provider, e.g., to interact with a server operated by the second service provider. The server operated by the second service provider may correspond to the second IP address (or the second FQDN). For example, the second application 411b may be a general-purpose application that may connect to an arbitrary IP (or any FQDN). For example, the second application 411b may provide a UI (e.g., address bar) for inputting a domain name (or IP). According to the user's input, the second application 411b may access the first IP address and the second IP address. Access to the IP address by the application may include creation of a socket associated with the application and/or connection with a socket with any port number of the corresponding IP address, but is not limited thereto. In the example of FIG. 4, it is assumed that use of a specific network slice type (e.g., eMBB) is allowed for the IP address and/or FQDN corresponding to the second service provider according to an agreement between the second service provider and the network operator. Meanwhile, it is assumed that use of the network slice is not allowed for the IP address and/or FQDN corresponding to the first service provider. Accordingly, packets including the data from (or to) the first application 411a need to be transmitted/received through a general PDU session, and packets including the data from (or to) the third application 411c need to be transmitted/received through a PDU session of a specific network slice type (e.g., eMBB). Meanwhile, packets associated with the first IP address (or first FQDN) among the packets including the data from (or to) the second application 411b need to be transmitted/received through the general PDU session. Packets associated with the second IP address (or second FQDN) among the packets including the data from (or to) the second application 411b need to be transmitted/received through the PDU session of the specific network slice type (e.g., eMBB).

According to various embodiments, the electronic device 101 may establish a first PDU session 421a and a second PDU session 421b. The second PDU session 421b may be associated with the specific network slice type (e.g., eMBB). In one example, the electronic device 101 may establish the second PDU session 421b associated with the specific network slice type based on transmission/reception of a PDU session establishment request message including the specific network slice type, but there is no limit to the establishment scheme. The electronic device 101 may establish a PDU session (e.g., the second PDU session 421b) based on the URSP rule, which is described below. The communication processor 440 (e.g., at least one of the first communication processor 212, the second communication processor, or the integrated communication processor 260)

may establish a second PDU session 421b of a specific network slice type (e.g., eMBB) and an Internet DNN. For example, if a network connection of the first application 411a is requested (or before the network connection request), the electronic device 101 (e.g., the processor 120 and/or the communication processor 440) may establish the first PDU session 421a of Internet DNN.

The electronic device 101 may form a first network interface 412a for transmission/reception of data packets between the processor 120 and the communication processor 440. For example, the processor 120 may provide a data packet from the first application 411a to the communication processor 440 through the first network interface 412a. It will be appreciated by one of ordinary skill in the art that a TCP/IP layer (not shown) is defined between the applications 411a, 411b, and 411c, and the network interfaces 412a and 412b so that data packets may be transmitted/received through TCP/IP. The communication processor 440 may transmit the packet provided through the first network interface 412a using the first PDU session 421a. It will be understood by one of ordinary skill in the art that a signal corresponding to the data packet from the communication processor 440 may be transmitted to the outside through an RF circuit (e.g., an RFIC, an RFFE, and/or an antenna module). The communication processor 440 may provide a packet corresponding to the signal received through the first PDU session 421a to the processor 120 through the first network interface 412a. The processor 120 may provide the data packet received through the first network interface 412a to the first application 411a matched thereto. The "network interface" may be, e.g., a logical interface for data transmission/reception between the processor 120 and the communication processor 440 and may be named, e.g., "rmnet". Meanwhile, in FIG. 4, two network interfaces 412a and 412b are shown as created, but this is merely an example and there is no limit to the number of network interfaces, three or more may be possible. For example, the processor 120 may provide a data packet from the third application 411c to the communication processor 440 through the second network interface 412b. The communication processor 440 may transmit the packet provided through the second network interface 412b using the second PDU session 421b. The communication processor 440 may provide a packet corresponding to the signal received through the second PDU session 421b to the processor 120 through the second network interface 412b. The processor 120 may provide the data packet received through the second network interface 412b to the third application 411c matched thereto. Meanwhile, the packet associated with the first IP address among the packets associated with the second application 411b may be transmitted/received through the first network interface 412a. The packet associated with the second IP address among the packets associated with the second application 411b may be transmitted/received through the second network interface 412b.

For example, the electronic device 101 may receive the URSP rule from the PCF (e.g., the PCF 307 of FIGS. 3A and 3B) through the AMF (e.g., the AMF 303 of FIGS. 3A and 3B) (or through a different route). The URSP rule may include a traffic descriptor and/or a route selection descriptor. For example, the second IP address may be included in the traffic descriptor of the URSP rule, and the Internet DNN and the slice type of eMBB may be included in the route selection descriptor. The electronic device 101 may establish the second PDU session 421b corresponding to the slice type of eMBB and the Internet DNN based on the URSP rule. For example, the electronic device 101 may previously establish the second PDU session 421b before a network connection request from the application, but there is no limitation on the establishment time. Thereafter, the packet associated with the second IP address may be transmitted/received through the first network interface 412a and the first PDU session 421a. Meanwhile, the electronic device 101 may establish the first PDU session 421a corresponding to the Internet DNN. For example, the second FQDN address may be included in the traffic descriptor of the URSP rule, and the Internet DNN and the slice type of eMBB may be included in the route selection descriptor. The electronic device 101 may establish the second PDU session 421b corresponding to the slice type of eMBB and the Internet DNN based on the URSP rule. For example, the electronic device 101 may previously establish the second PDU session 421b before a network connection request from the application, but there is no limitation on the establishment time. The electronic device 101 may query the DNS for the second FQDN. The electronic device 101 may identify that the IP corresponding to the second FQDN is the second IP address, based on information from the DNS. Thereafter, the packet associated with the second IP address may be transmitted/received through the first network interface 412a and the first PDU session 421a.

According to various embodiments, a first source IP address may be assigned to the first network interface 412a, and a second IP address may be assigned to the second network interface 412b. If the destination IP address corresponding to the data from the second application 411b is the first IP address, the electronic device 101 may transmit/receive packets through the first network interface 412a and the first PDU session 421a as described above. In this case, the source IP address of the packet may be set as the first source IP address. If the destination IP address corresponding to the data from the second application 411b is the second IP address, as described above, the electronic device 101 may transmit/receive packets through the second network interface 412b and the second PDU session 421b. In this case, the source IP address of the packet may be set as the second source IP address. As is described in greater detail below, in an example, the electronic device 101 may generate a new packet corresponding to a previously generated packet and transmit it through the second network interface 412b and the second PDU session 421b. The new packet may include the second source IP address. In another example, the electronic device 101 may transmit a packet including the second source IP address through the second network interface 412b and the second PDU session 421b.

Figure 5:
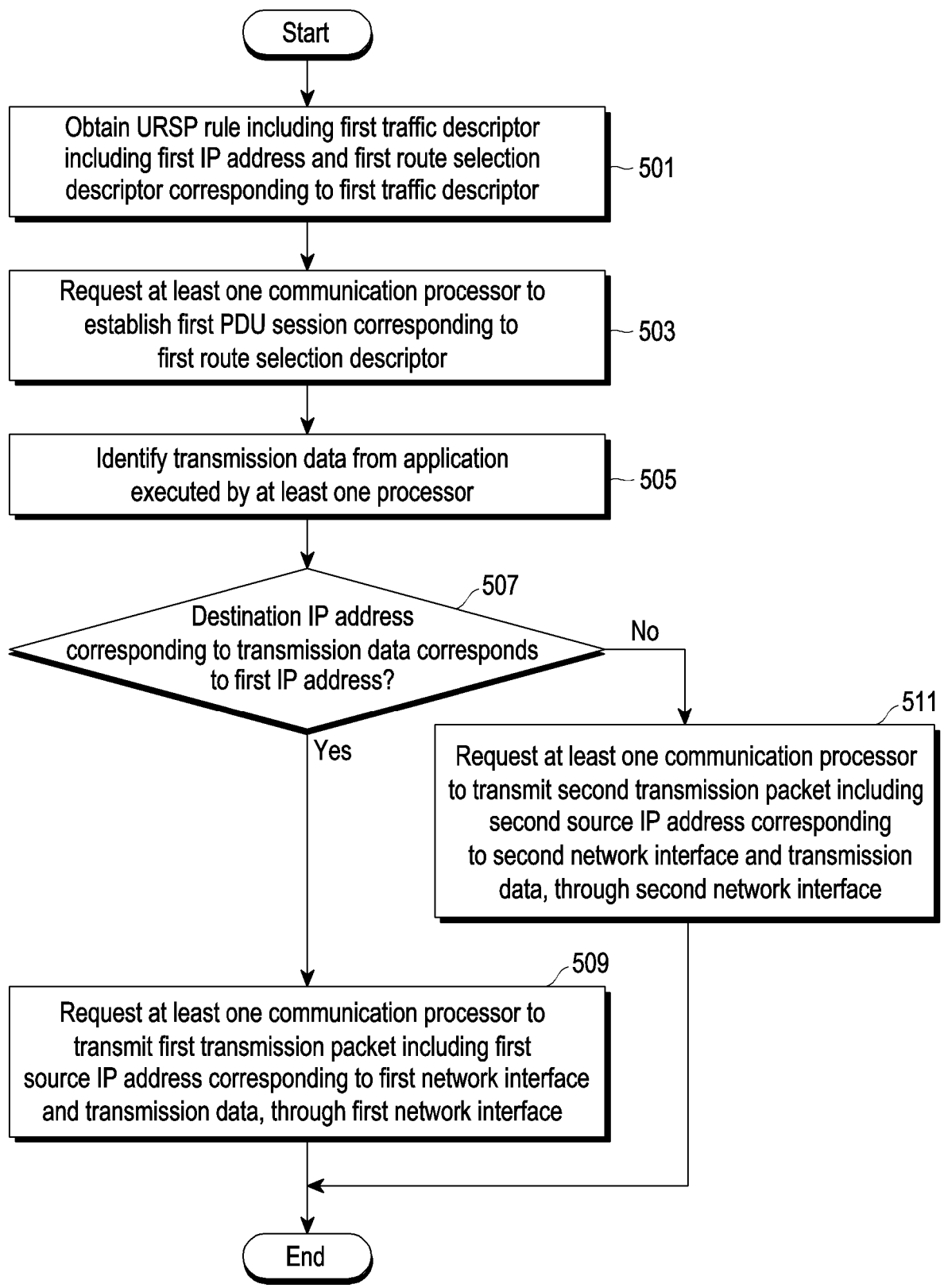
FIG. 5 is a flowchart illustrating an example method of operating an electronic device according to various embodiments.

FIG. 5 is a flowchart illustrating an example method of operating an electronic device according to various embodiments.

According to various embodiments, the electronic device 101 (e.g., at least one of the processor 120 of FIG. 1, the first communication processor 212 of FIG. 2A, the second communication processor 214 of FIG. 2A, the integrated communication processor 260 of FIG. 2B, or the communication processor 440 of FIG. 4) may obtain (or receive) a URSP rule including a first traffic descriptor including a first IP address and a first route selection descriptor corresponding to the first traffic descriptor in operation 501. For example, the electronic device 101 may obtain the URSP rule from the PCF 307, but there is no limitation on the acquisition route. In another example, the electronic device 101 may obtain a URSP rule from a server that manages the URSP rule. In another example, the electronic device 101 may identify a URSP rule previously stored in the memory 130 of the electronic device 101 or a SIM card (or eSIM included in the electronic device 101) connected to (or inserted in) the electronic device 101.

According to various embodiments, the electronic device 101 may request at least one communication processor (e.g., at least one of the first communication processor 212, the second communication processor 214, the integrated communication processor 260, or the communication processor 440) to establish a first PDU session corresponding to a first route selection descriptor in operation 503. In various embodiments, the electronic device 101 may request at least one communication processor to establish the first PDU session corresponding to the first route selection descriptor even before the network connection request from the application is identified. For example, the electronic device 101 may obtain a URSP rule as shown in Table 1.

TABLE 1

TrafficDescriptor0
  IP: 172.217.175.14
  Route selection descriptor
    S-NSSAI: eMBB
    DNN: 5g.aaa.com
TrafficDescriptor1-FQDN: www.bbb.com
  Route selection descriptor
    S-NSSAI: eMBB
    DNN: 5g.aaa.com The URSP rule of Table 1 may include a first traffic descriptor (TrafficDescriptor0) including an IP address and a corresponding route selection descriptor, and a second traffic descriptor (TrafficDescriptor1) including an FQDN and a corresponding route selection descriptor. The electronic device 101 may transmit a PDU session establishment request message to the network based on the URSP rule shown in Table 1. The PDU session establishment request message may include at least one of, e.g., S-NSSAI, DNN, PDU session ID, request type, existing PDU session ID, or N1 SM container. According to the URSP rule of Table 1, the electronic device 101 may transmit a PDU session establishment request message including the N-SSAI (e.g., the SST value of "I") of eMBB and the DNN of "5g.aaa.com". The electronic device 101 and/or the network may perform a procedure for establishing a PDU session based on transmission/reception of the PDU session establishment request message, which may comply with 3GPP TS 23.502. Thus, a detailed description thereof is not provided. As described above, a PDU session corresponding to the N-SSAI of eMBB and the DNN of "5g.aaa.com" may be established.

According to various embodiments, the electronic device 101 may identify transmission data from an application executed by at least one processor in operation 505. In operation 507, the electronic device 101 may determine whether the destination IP address corresponding to the transmission data corresponds to the first IP address, e.g., 172.217.175.14 of Table 1. If the destination IP address corresponding to the transmission data corresponds to the first IP address (Yes in 507), the electronic device 101 may send a request for transmission of a first transmission packet including transmission data and a first source IP address corresponding to the first network interface to at least one communication processor through the first network interface in operation 509. The first transmission packet through the first network interface may be transmitted through the PDU session corresponding to the DNN of "5g.aaa.com". If the destination IP address corresponding to the transmission data does not correspond to the first IP address (No in 507), the electronic device 101 may send a request for transmission of a second transmission packet including transmission data and a second source IP address corresponding to the second network interface to at least one communication processor through the second network interface in operation 511. The second transmission packet through the second network interface may be transmitted through another PDU session.

As described above, the first transmission packet having the first destination IP address, for which use of network slice is required, may be transmitted through the first PDU session. Further, the second transmission packet having the second destination IP address, for which the use of network slice is not allowed, may be transmitted through the second PDU session rather than the first PDU session.

According to various embodiments, the electronic device 101 may establish a PDU session based on transmitting a PDU session establishment request message to the network, based on the URSP rule as shown in Table 1. For example, a PDU session corresponding to the N-SSAI of eMBB and the DNN of "5g.aaa.com" may be established. The electronic device 101 may query the IP address corresponding to the FQDN of "www.bbb.com" based on information about the DNS identified in the PDU session establishment process. The electronic device 101 may obtain an IP address corresponding to the FQDN of "www.bbb.com" from the DNS. For example, the electronic device 101 assumes that the IP address corresponding to the FQDN of "www.bbb.com" is 172.217.175.15. The electronic device 101 may determine whether the destination IP address corresponding to the transmission data corresponds to the IP address identified from DNS, e.g., 172.217.175.15 of Table 1. If the destination IP address corresponding to the transmission data corresponds to the IP address identified from the DNS, the electronic device 101 may send a request for transmission of a first transmission packet including transmission data and a first source IP address corresponding to the first network interface to at least one communication processor through the first network interface. If the destination IP address corresponding to the transmission data does not correspond to the IP address identified from the DNS, the electronic device 101 may send a request for transmission of a second transmission packet including transmission data and a second source IP address corresponding to the second network interface to at least one communication processor through the second network interface. The second transmission packet through the second network interface may be transmitted through another PDU session. As described above, the first transmission packet corresponding to the FQDN of bbb.com, for which use of network slice is required, may be transmitted through the first PDU session. Further, the second transmission packet not corresponding to the FQDN of bbb.com, for which the use of network slice is not allowed, may be transmitted through the second PDU session rather than the first PDU session.

Figure 6:
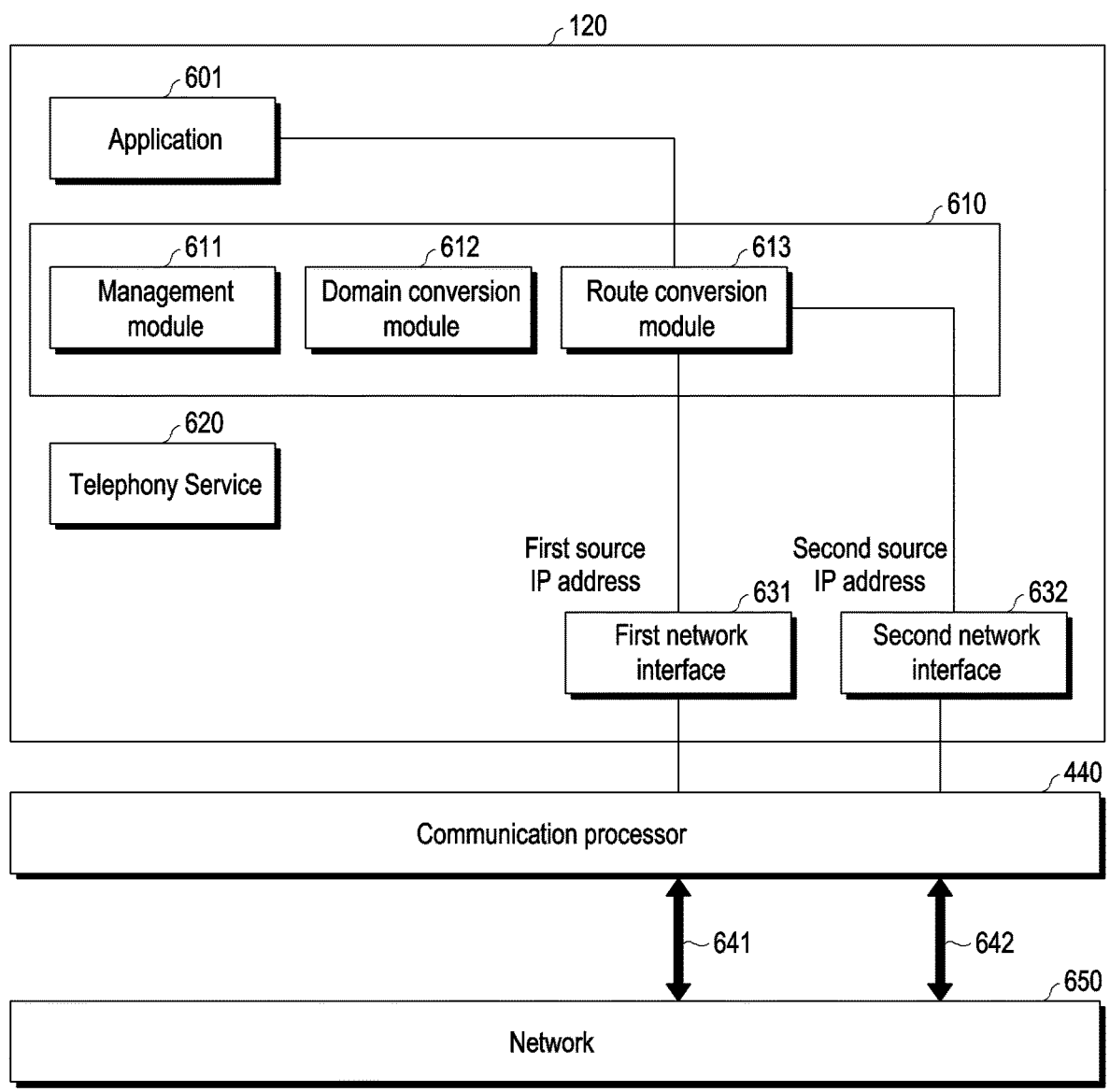
FIG. 6 is a block diagram illustrating an example electronic device according to various embodiments.

FIG. 6 is a block diagram illustrating an example of an electronic device according to various embodiments.

According to various embodiments, an application 601 may be executed on the processor 120. For example, it is assumed that the application 601 is a general-purpose application that may access a plurality of IP addresses. The application 601 may be executed, e.g., on an application (e.g., application 146 of FIG. 1) layer, but is not limited thereto. The application 601 executed on the processor 120 may transmit/receive data to and from the network 650 through the communication processor 440.

According to various embodiments, a URSP service module 610 and a TelephonyService 620 may be executed on the processor 120. The URSP service module 610 may include a management module 611, a domain conversion module 612, and a route conversion module 613. The operation of at least one of the management module 611, the domain conversion module 612, or the TelephonyService 620 may refer, for example, to the operation of the application processor (e.g., the processor 120) or the electronic device 101.

According to various embodiments, the management module 611 may store and/or manage the URSP rule obtained based on at least one route. For example, the management module 611 may store and/or manage the URSP rules in the electronic device 101 or from a SIM card connected with the electronic device 101. For example, the management module 611 may store and/or manage the URSP rule from a PCF or management server. The management module 611 may request the TelephonyService 620 to establish at least one PDU session based on the URSP rule stored and/or managed. The TelephonyService 620 may provide information necessary to establish a PDU session, e.g., a traffic descriptor and/or a route selection descriptor, to the communication processor 440. The communication processor 440 may perform at least one procedure for establishing a PDU session (e.g., transmitting a PDU session establishment request message and/or receiving a PDU session establishment accept message) based on the received information. For example, a traffic descriptor including a specific IP address (e.g., 172.217.175.14) and a corresponding route selection descriptor (e.g., S-NSSAI: eMBB, DNN: 5g.aaa.com) may be included in the URSP. The management module 611 may request the TelephonyService 620 to establish a PDU session corresponding to, e.g., the route selection descriptor (e.g., S-NSSAI: eMBB, DNN: 5g.aaa.com). Accordingly, a second PDU session 642 corresponding to the route selection descriptor included in the URSP rule may be established. For example, the electronic device 101 may previously establish the second PDU session 642 before the network connection request and/or the data transmission request from the application 601 is identified, but there is no limitation to the establishment time. Meanwhile, the electronic device 101 may establish a first PDU session 641. The first PDU session 641 may be a PDU session not related to the URSP rule and may transmit and receive data without being limited by the URSP rule. There is no limitation on the establishment time of the first PDU session 641.

According to various embodiments, a first network interface 631 (e.g., rmnet0) corresponding to the first PDU session 641 may be established, and a second network interface 632 (e.g., rmnet1) corresponding to the second PDU session 642 may be established. The first network interface 631 may be assigned a first source IP address, and the second network interface 632 may be assigned a second source IP address. The management module 611 may generate and/or manage association information (hereinafter, interchangeably used with "rule") between the IP address and the network interface (or PDU session) included in the URSP rule. Table 2 is an example of the rule generated by the management module 611.

TABLE 2

Default Network Interface: rmnet0
Network Slicing Network Interface: eMBB, rmnet1
   Traffic Descriptor0: [172.217.175.14, rmnet1]

Referring to Table 2, a network interface (e.g., a default network interface) used for transmission and reception of data not related to a network slice may be a first network interface 631 (e.g., rmnet0). A network interface (e.g., a network slicing network interface) used for transmission and reception of data associated with a network slice type of eMBB may be a second network interface 632 (e.g., rmnet1). Further, association information between the second network interface 632 (e.g., rmnet1) and a specific IP address (e.g., 172.217.175.14) may be generated and/or managed. The management module 631 may provide the generated and/or managed rule to the route conversion module 613.

According to various embodiments, the domain conversion module 612 may convert the FQDN included in the URSP rule into an IP address. For example, it is assumed that the URSP rule obtained by the management module 611 includes a traffic descriptor including an FQDN (e.g., "www.bbb.com") and a corresponding route selection descriptor (e.g., S-NSSAI: eMBB, DNN: 5g.aaa.com). The management module 611 may request the domain conversion module 612 to convert the FQDN into an IP address. The domain conversion module 612 may query the DNS for the requested FQDN. The domain conversion module 612 may obtain an IP address corresponding to the FQDN from DNS. The domain conversion module 612 may provide the obtained IP address (e.g., 172.217.175.14) to the management module 611. The management module 611 may update the rule based on the information provided from the domain conversion module 612. Table 3 is an example of the updated rule.

TABLE 3

Default Network Interface: rmnet0
Network Slicing Network Interface: eMBB, rmnet1
   Traffic Descriptor0: [172.217.175.14, rmnet1]
   Traffic Descriptor1: ["www.bbb.com", 172.217.175.15, rmnet1]

Referring to Table 3, association information between the second network interface 632 (e.g., rmnet1) and a specific FQDN (e.g., "www.bbb.com") and/or a specific IP address (e.g., 172.217.175.15) may be added as compared with Table 2. The example of Table 3 is associated with one network interface (e.g., rmnet1) in that the IP address (e.g., 172.217.175.14) and the FQDN (e.g., "www.bbb.com") in the URSP rule correspond to the same route selection descriptor, but this is merely an example. If the IP address (e.g., 172.217.175.14) and the FQDN (e.g., "www.bbb.com") correspond to different route selection descriptors, an additional PDU session may be further established, and a corresponding additional network interface may be formed. The management module 611 may provide the rule to the route conversion module 613. According to various embodiments, the domain conversion module 612 may query the DNS again for an FQDN when an IP address update is required, which is described below.

According to various embodiments, the route conversion module 613 may provide a packet including transmission data through the second network interface 632 if the destination IP address corresponding to the transmission data from the application 601 is an IP address (e.g., 172.217.175.14 or 172.217.175.15) for a network slice. Accordingly, the packet may be transmitted through the PDU session 642 of the network slice type (e.g., eMBB). Meanwhile, the route conversion module 613 may provide a packet including transmission data through the first network interface 631 if the destination IP address corresponding to the transmission data from the application 601 is not the IP address (e.g., 172.217.175.14 or 172.217.175.15) for the network slice. Accordingly, the packet may be transmitted via the PDU session 641 that is not associated with the network slice.

According to various embodiments, when a packet is received through the first network interface 631, the route conversion module 613 may provide the packet to the application 601 (e.g., through TCP/IC). When a packet is received through the second network interface 631, the route conversion module 613, if the source IP address of the packet is the IP address (e.g., 172.217.175.14 or 172.217.175.15) included in the rule, the route conversion module 613 may provide it to the application 601 (e.g., through TCP/IC) through the first network interface 631.

According to various embodiments, the TelephonyService 620 may request the communication processor 440 to establish a PDU session, as described above. The TelephonyService 620 may provide information (e.g., a traffic descriptor and/or a route selection descriptor) required for establishment of a PDU session to the communication processor 440. The TelephonyService 620 may inform the communication processor 440 which URSP rule is to use each of the network interface 631 and 632. The TelephonyService 620 may include a radio interface layer (RIL).

According to various embodiments, the communication processor 440 (e.g., at least one of the first communication processor 212, the second communication processor 214, or the integrated communication processor 260) may store what URSP rule each of the network interfaces 631 and 632 is to be used by. When it is requested to establish a PDU session, the communication processor 440 may perform at least one procedure for establishing a PDU session.

Figure 7:
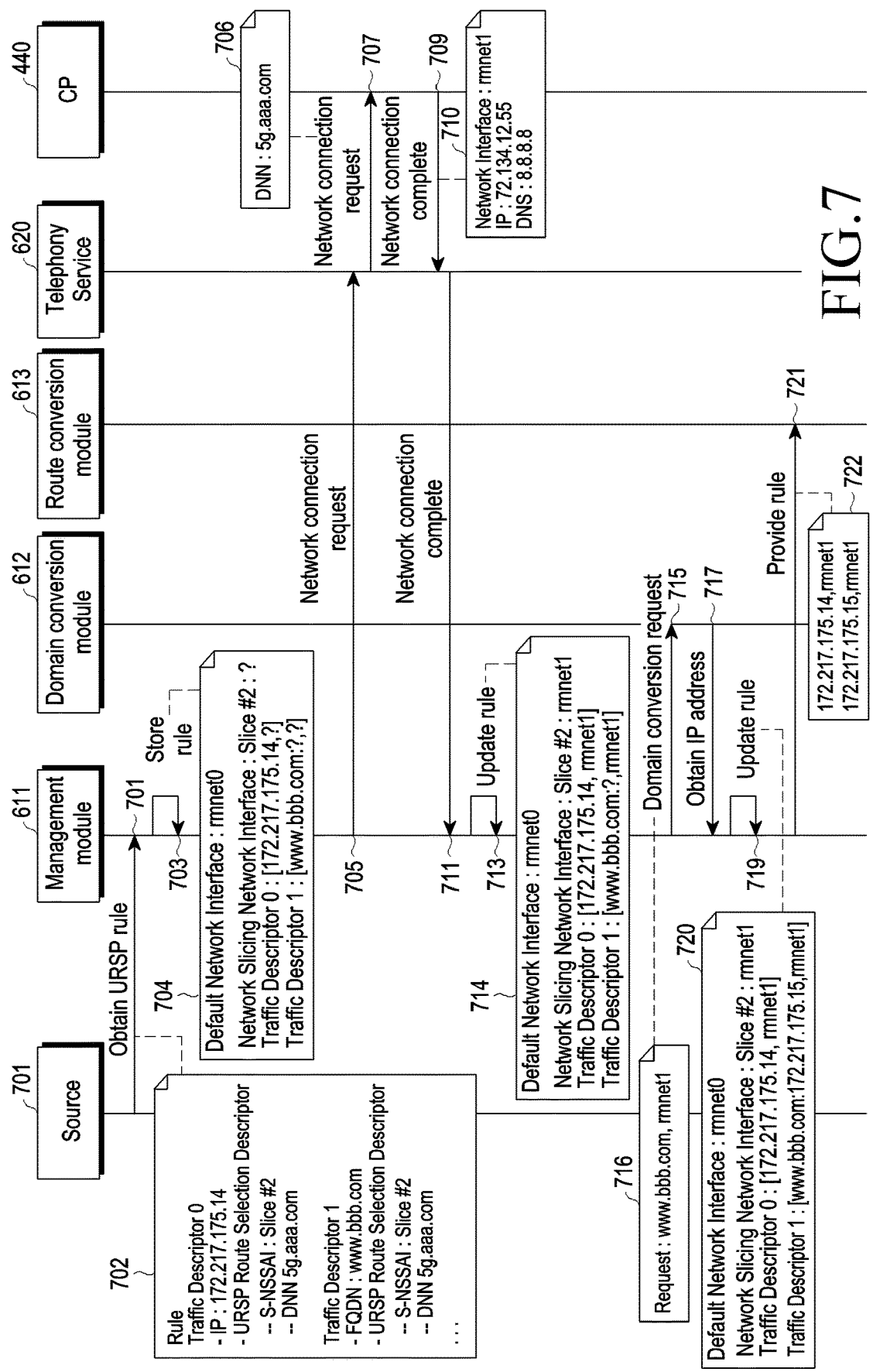
FIG. 7 is a signal flow diagram illustrating example operations of an electronic device according to various embodiments.

FIG. 7 is a signal flow diagram illustrating example operations of an electronic device according to various embodiments.

According to various embodiments, the management module 611 may obtain a URSP rule 702 from a source 701 in operation 701. The source 701 may be at least one of a PCF, a URSP rule management server, a storage space in the electronic device 101, or a SIM card connected with the electronic device 101, but is not limited thereto. For example, the URSP rule 702 of the embodiment of FIG. 7 may include a first traffic descriptor (Traffic Descriptor 0), a route selection descriptor corresponding to the first traffic descriptor, a second traffic descriptor (Traffic Descriptor 1), and a route selection descriptor corresponding to the second traffic descriptor. The first traffic descriptor (Traffic Descriptor 0) may include a first IP address (e.g., 172.217.175.14), and the route selection descriptor corresponding thereto may include "slice #2" which is an S-NSSAI corresponding to "eMBB", and the DNN of "5g.aaa.com". The second traffic descriptor (Traffic Descriptor 1) may include a first FQDN (e.g., "www.bbb.com"), and the route selection descriptor corresponding thereto may include "slice #2", which is an S-NSSAI corresponding to "eMBB", and the DNN of "5g.aaa.com". Meanwhile, the information included in the URSP rule 702 is merely an example, and at least part thereof may be excluded, or additional information may be further included.

According to various embodiments, the management module 611 may store an initial rule 704 primarily generated in operation 703. The initial rule 704 may include information indicating that a default network interface is "rmnet0". The initial rule 704 may include information indicating that a network interface to which network slicing is applied (network slicing network interface) is applied to "slice #2". Since the PDU session to which network slicing is applied is not yet established (or not yet identified), the identification information about the network interface may be undecided (e.g., marked as "?"). The initial rule 704 may include information indicating that traffic descriptors applied to "slice #2" are the first traffic descriptor (Traffic Descriptor 0) and the second traffic descriptor (Traffic Descriptor 1). The first traffic descriptor (Traffic Descriptor 0) in the rule 704 may include the first IP address (e.g., 172.217.175.14), and the second traffic descriptor (Traffic Descriptor 1) in the rule 704 may include the first FQDN (e.g., "www.bbb.com"). Meanwhile, identification information about the network interface corresponding to the first traffic descriptor (Traffic Descriptor 0) and the second traffic descriptor (Traffic Descriptor1) may be undecided (e.g., marked as "?"). Further, since the IP address corresponding to the first FQDN is not yet identified, it will be easily understood by one of ordinary skill in the art that although it is marked as "?", the format indicating that identification information is undecided is not limited thereto. For example, it may contain no value or may contain a default value (e.g., 0). Meanwhile, the information included in the rule 704 is merely an example, and at least part thereof may be excluded, or additional information may be further included.

According to various embodiments, the management module 611 may send a request for network connection to the TelephonyService 620 in operation 705. The TelephonyService 620 may send a request for network connection to the communication processor 440 in operation 707. The network connection request 706 may include a DNN (e.g., "5g.aaa.com"). Meanwhile, there is no limitation on the information included in the network connection request 706. For example, S-NSSAI may be further included, or S-NSSAI may be included in place of DNN. The communication processor 440 may establish a PDU session based on the network connection request 706. For example, the communication processor 440 may transmit a PDU session establishment request message using the information included in the network connection request 706. When a PDU session is established, the communication processor 440 may notify the TelephonyService 620 that connection is complete in operation 709. The network connection complete information 710 may include identification information (e.g., "rmnet1") about the network interface corresponding to the established PDU session, the source IP address (e.g., 72.134.12.55) assigned to the corresponding network interface, and/or DNS information (e.g., 8.8.8.8). The TelephonyService 620 may notify the management module 611 that network connection is complete in operation 711. Meanwhile, the information included in the network connection complete information 710 is merely an example, and at least part thereof may be excluded, or additional information may be further included.

According to various embodiments, in operation 713, the management module 611 may update the initial rule 704 to generate and/or manage an updated rule 714. The updated rule 714 may replace the undecided network interface identification information marked as "?" in the initial rule 704 with "rmnet1", which is the network interface identification information received in operation 711.

According to various embodiments, in operation 715, the management module 611 may send a request for domain conversion to the domain conversion module 612. The domain conversion request 716 may include the FQDN (e.g., "www.bbb.com") and/or network interface identification information (e.g., rmnet1) included in the updated rule 714. Meanwhile, the domain conversion request 716 may include information about DNS (e.g., 8.8.8.8). The domain conversion module 612 may query the DNS for the first FQDN (e.g., "www.bbb.com") and may receive the corresponding IP address (e.g., 172.217.175.15) from DNS. As the domain conversion module 612 provides the IP address (e.g., 172.217.175.15) corresponding to the first FQDN (e.g., "www.bbb.com") to the management module 611, in operation 717, the management module 611 may obtain the IP address (e.g., 172.217.175.15).

According to various embodiments, in operation 719, the management module 611 may update the previous rule 714 to generate and/or manage an updated rule 720. The updated rule 720 may replace the IP address corresponding to the undecided FQDN marked as "?" in the previous rule 714 with 172.217.175.15, which is the IP address received in operation 717. The management module 611 may provide at least part 722 of the rule 720 (or association information between the network interface and IP address generated based on the rule 720) to the route conversion module 613 in operation 721. Although not shown, the route conversion module 613 may transmit and/or receive a packet associated with a specific IP address through a corresponding network interface based on at least part 722 of the received rule 720 (or association information between the IP address and the network interface). The packet processing of the route conversion module 613 is described below.

Figure 8:
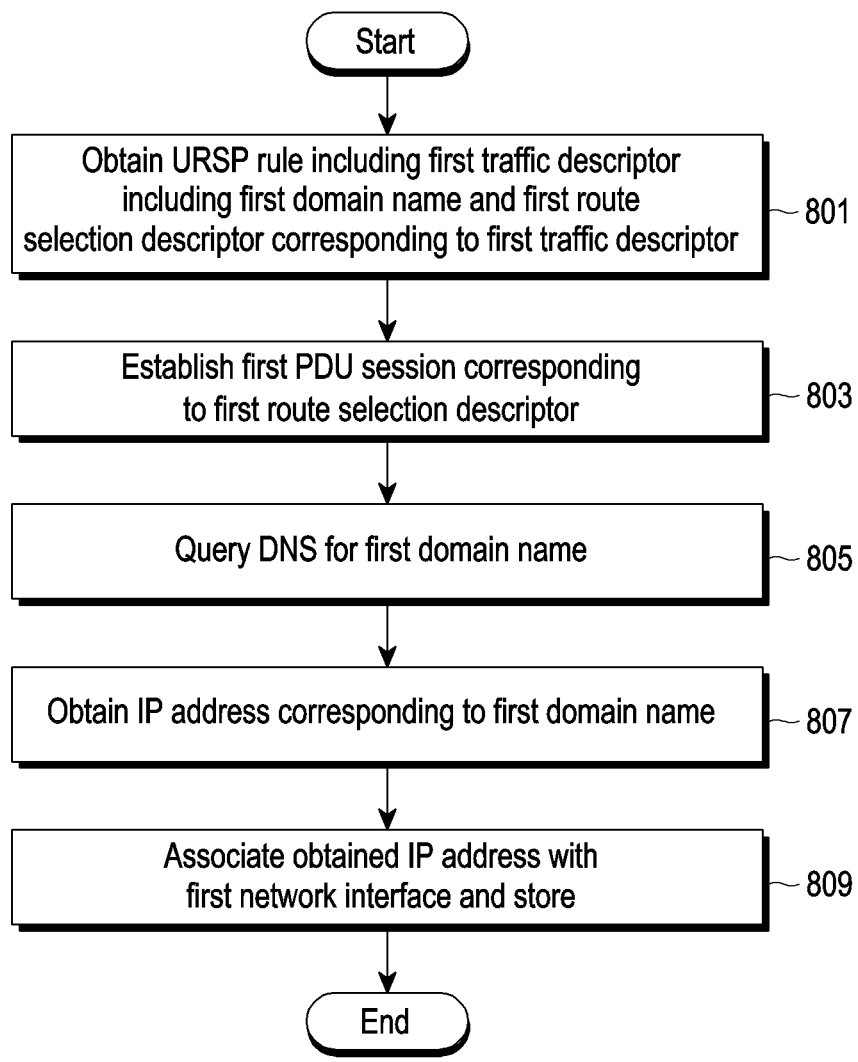
FIG. 8 is a flowchart illustrating example operations of an electronic device according to various embodiments.

FIG. 8 is a flowchart illustrating example operations of an electronic device according to various embodiments.

According to various embodiments, the electronic device 101 (e.g., at least one of the processor 120, the first communication processor 212, the second communication processor 214, the integrated communication processor 260, or the communication processor 440) may obtain a URSP rule including a first traffic descriptor including a first domain name and a first route selection descriptor corresponding to the first traffic descriptor in operation 801. For example, it is assumed that the electronic device 101 obtains a URSP rule including the TrafficDescriptor1 of Table 1 including the FQDN of "www.bbb.com" and the route selection descriptor corresponding thereto from various sources.

According to various embodiments, the electronic device 101 may establish a first PDU session corresponding to the first route selection descriptor in operation 803. For example, the electronic device 101 may establish a PDU session to which network slicing is applied based on transmitting a PDU session establishment request message including at least a portion of the first route selection descriptor. In operation 805, the electronic device 101 may query the DNS for a first domain name. In operation 807, the electronic device 101 may obtain an IP address corresponding to the first domain name, e.g., 172.217.175.15, from DNS. In operation 809, the electronic device 101 may associate the obtained IP address with the first network interface corresponding to the established PDU session and store it. For example, when the network interface corresponding to the established PDU session for network slicing is rmnet1, the electronic device 101 may associate rmnet1 with 172.217.175.15 obtained. Although not shown, when the destination IP address corresponding to the transmission data is 172.217.175.15, the electronic device 101 may transmit the corresponding packet through rmnet1. Although not shown, when the source IP address of the received packet is 172.217.175.15, the electronic device 101 may transfer the packet received through rmnet1 (or a packet newly generated based on the received packet) to the default network interface (e.g., rmnet0) and provide it to the application (e.g., via TCP/IP) through the default network interface. If the electronic device 101 accesses a site irrelevant to the URSP rule using an Internet browsing application, packets may be transmitted/received through a general PDU session. If the electronic device 101 accesses the site corresponding to the domain name of "www.bbb.com" using the Internet browsing application, packets may be transmitted/received through the established PDU session for network slicing.

Figure 9:
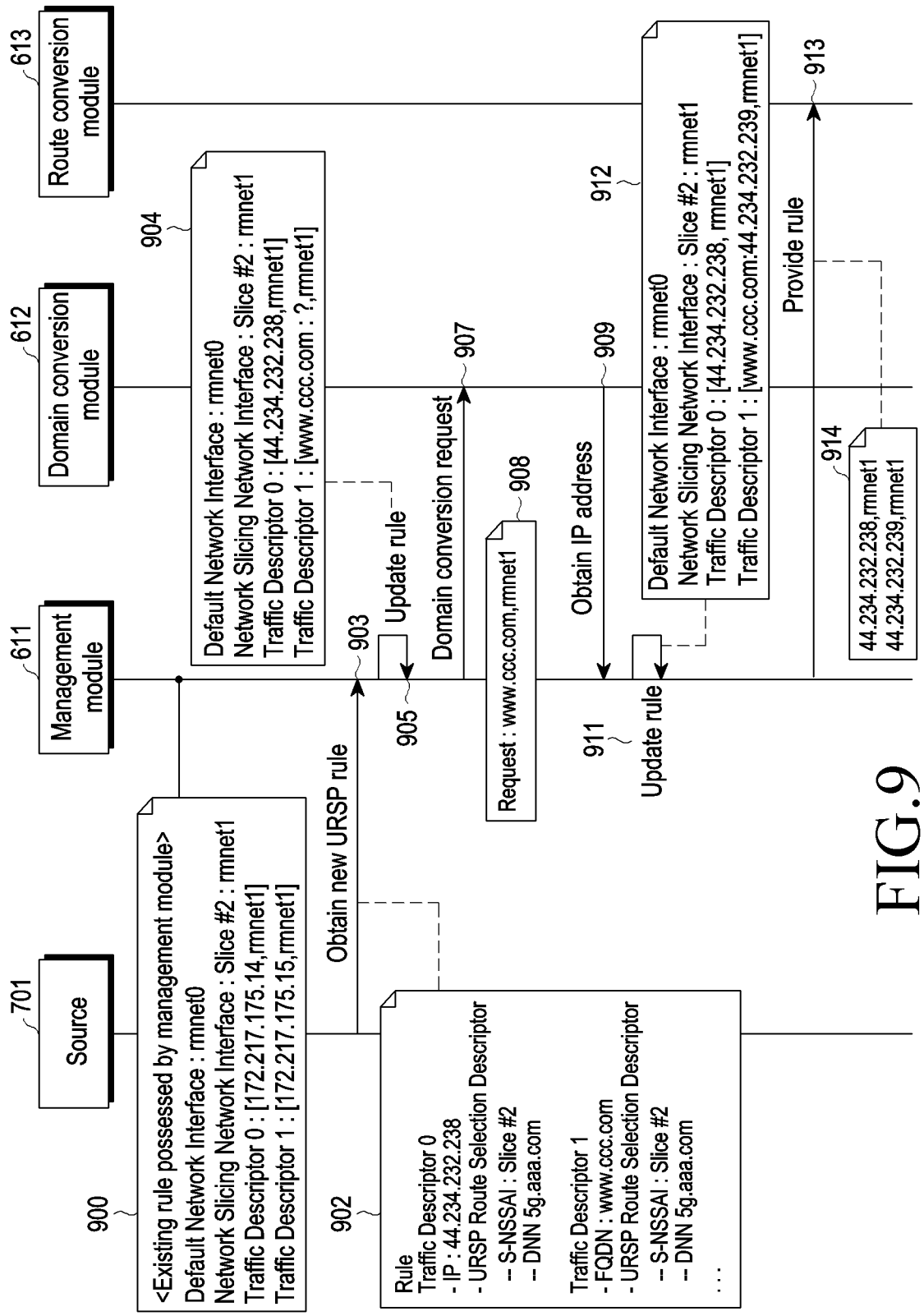
FIG. 9 is a signal flow diagram illustrating example operations of an electronic device according to various embodiments.

FIG. 9 is a signal flow diagram illustrating example operations of an electronic device according to various embodiments.

According to various embodiments, the management module 611 may previously store a rule 900. For example, the rule 900 in FIG. 9 may include information indicating that a network interface, rmnet1, to which network slicing is applied (network slicing network interface) is applied to "slice #2". The rule 900 may include information indicating that traffic descriptors applied to "slice #2" are the first traffic descriptor (Traffic Descriptor 0) and the second traffic descriptor (Traffic Descriptor 1). The first traffic descriptor (Traffic Descriptor 0) in the rule 900 may include the first IP address (e.g., 172.217.175.14), and the second traffic descriptor (Traffic Descriptor 1) in the rule 900 may include the second IP address (e.g., 172.217.175.15). Identification information about the network interface corresponding to the first traffic descriptor (Traffic Descriptor 0) and the second traffic descriptor (Traffic Descriptor1) may be rmnet1.

According to various embodiments, the management module 611 may obtain a new URSP rule 902 from a source 701 in operation 903. The new URSP rule 902 may include a first traffic descriptor (Traffic Descriptor 0), a route selection descriptor corresponding to the first traffic descriptor, a second traffic descriptor (Traffic Descriptor 1), and a route selection descriptor corresponding to the second traffic descriptor. The first traffic descriptor (Traffic Descriptor 0) may include a first IP address (e.g., 44.234.232.238), and the route selection descriptor corresponding thereto may include "slice #2" which is an S-NSSAI corresponding to "eMBB", and the DNN of "5g.aaa.com". The second traffic descriptor (Traffic Descriptor 1) may include a first FQDN (e.g., "www.ccc.com"), and the route selection descriptor corresponding thereto may include "slice #2", which is an S-NSSAI corresponding to "eMBB", and the DNN of "5g.aaa.com". Meanwhile, the information included in the URSP rule 902 is merely an example, and at least part thereof may be excluded, or additional information may be further included. Meanwhile, in light that the route selection descriptor included in the new URSP rule 902 is identical to the route selection descriptor included in the existing URSP rule, the management module 611 may use the existing PDU session rather than establishing a new PDU session. In another example, the management module 611 may terminate the existing PDU session for network slicing whenever the URSP rule is updated without the above-described comparison process and establish a new PDU session based on the updated URSP rule.

According to various embodiments, the management module 611 may update the rule in operation 905. For example, the management module 611 may update the existing rule 900, generating and/or managing a rule 904. The updated rule 904 may include information indicating that a network interface, rmnet1, to which network slicing is applied (network slicing network interface) is applied to "slice #2". The rule 904 may include information indicating that traffic descriptors applied to "slice #2" are the first traffic descriptor (Traffic Descriptor 0) and the second traffic descriptor (Traffic Descriptor 1). The first traffic descriptor (Traffic Descriptor 0) in the rule 904 may include the updated first IP address (e.g., 44.234.232.238), and the second traffic descriptor (Traffic Descriptor 1) in the rule 904 may include the first FQDN (e.g., "ccc.com"). Identification information about the network interface corresponding to the first traffic descriptor (Traffic Descriptor 0) and the second traffic descriptor (Traffic Descriptor1) may be rmnet1. Meanwhile, the IP address corresponding to the first FQDN (e.g., "ccc.com") may be undecided (marked as "?") as it is not yet identified.

According to various embodiments, in operation 907, the management module 611 may provide a request for domain conversion to the domain conversion module 612. The domain conversion request 908 may include the FQDN (e.g., "www.ccc.com") and/or network interface identification information (e.g., rmnet1) included in the updated rule 904. Meanwhile, the domain conversion request 716 may include information about DNS (e.g., 8.8.8.8). The domain conversion module 612 may query the DNS for the first FQDN (e.g., "www.ccc.com") and may receive the corresponding IP address (e.g., 44.234.232.239) from DNS. As the domain conversion module 612 provides the IP address (e.g., 44.234.232.239) corresponding to the first FQDN (e.g., "www.ccc.com") to the management module 611, in operation 909, the management module 611 may obtain the IP address (e.g., 44.234.232.239).

According to various embodiments, in operation 911, the management module 611 may update the previous rule 904 to generate and/or manage an updated rule 912. The updated rule 720 may replace the IP address corresponding to the undecided FQDN marked with "?" in the previous rule 904 with 44.234.232.239, which is the IP address received in operation 909. The management module 611 may provide at least part 914 of the rule 912 (or association information between the network interface and IP address generated based on the rule 720) to the route conversion module 613 in operation 913. Although not shown, the route conversion module 613 may transmit and/or receive a packet associated with a specific IP address through a corresponding network interface based on at least part 914 of the received rule 912 (or association information between the IP address and the network interface). The packet processing of the route conversion module 613 is described below.

Figure 10:
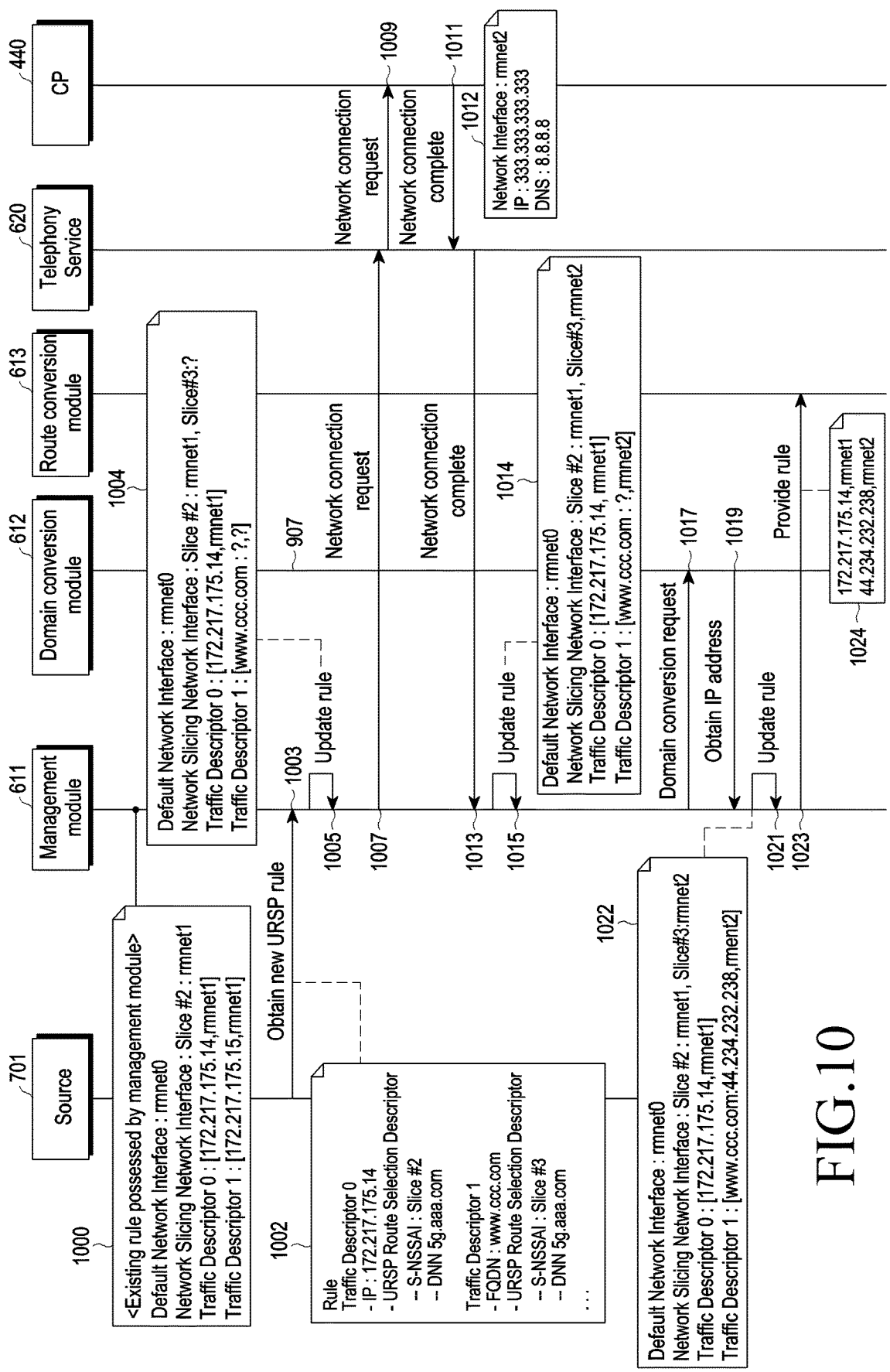
FIG. 10 is a signal flow diagram illustrating example operations of an electronic device according to various embodiments.

FIG. 10 is a signal flow diagram illustrating example operations of an electronic device according to various embodiments.

According to various embodiments, the management module 611 may previously store a rule 1000. For example, the rule 1000 in FIG. 10 may, for example, include the same information as the rule 900 in FIG. 9, and accordingly, a detailed description of the rule 1000 is not repeated.

According to various embodiments, the management module 611 may obtain a new URSP rule 1002 from a source 701 in operation 1003. The new URSP rule 1002 may include a first traffic descriptor (Traffic Descriptor 0), a route selection descriptor corresponding to the first traffic descriptor, a second traffic descriptor (Traffic Descriptor 1), and a route selection descriptor corresponding to the second traffic descriptor. The first traffic descriptor (Traffic Descriptor 0) may include a first IP address (e.g., 172.217.15.4), and the route selection descriptor corresponding thereto may include "slice #2" which is an S-NSSAI corresponding to "eMBB", and the DNN of "5g.aaa.com". The second traffic descriptor (Traffic Descriptor 1) may include a first FQDN (e.g., "www.ccc.com"), and the route selection descriptor corresponding thereto may include "slice #3", which is an S-NSSAI corresponding to "URLLC", and the DNN of "5g.aaa.com". Meanwhile, the information included in the URSP rule 1002 is merely an example, and at least part thereof may be excluded, or additional information may be further included.

According to various embodiments, the management module 611 may update the rule in operation 1005. For example, the management module 611 may update the existing rule 1000 based on the existing rule 1000, generating and/or managing a rule 1004. As compared with the existing rule 1000, the updated rule 1004 may add information about the S-NSSAI (e.g., slice #3) of the network slice type added to the new URSP rule 1002. Further, as the IP address 172.217.175.15 in the existing rule 1000 is not included in the new URSP rule 1002, the updated rule 1004 may not include information associated with 172.217.175.15. Further, information about the FQDN (e.g., "ccc.com") newly added may be added to the new URSP rule 1002. Meanwhile, since the IP address for the FQDN of "ccc.com" has not been identified yet, this may be managed as an undecided (marked as "?"). Meanwhile, since the network interface corresponding to "ccc.com" is not yet formed, this may be managed as undecided (marked as "?").

According to various embodiments, the management module 611 may send a request for network connection to the TelephonyService 620 in operation 1007. The TelephonyService 620 may send a request for network connection to the communication processor 440 in operation 1009. The network connection request may include a DNN (e.g., "5g.aaa.com"). Meanwhile, there is no limitation on the information included in the network connection request. For example. S-NSSAI may be further included, or S-NSSAI may be included in place of DNN. The communication processor 440 may establish a PDU session based on the network connection request. For example, the communication processor 440 may transmit a PDU session establishment request message using the information included in the network connection request.

When a PDU session is established, the communication processor 440 may notify the TelephonyService 620 that connection is complete in operation 1011. The network connection complete information 1012 may include identification information (e.g., "rmnet2") about the network interface corresponding to the established PDU session, the source IP address (e.g., 333.333.333.333) assigned to the corresponding network interface, and/or DNS information (e.g., 8.8.8.8). The TelephonyService 620 may notify the management module 611 that network connection is complete in operation 1013. Meanwhile, the information included in the network connection complete information 710 is merely an example, and at least part thereof may be excluded, or additional information may be further included.

According to various embodiments, in operation 1015, the management module 611 may update the existing rule 1004 to generate and/or manage an updated rule 1014. The updated rule 1014 may replace the undecided network interface identification information marked with "?" in the existing rule 1004 with "rmnet2", which is the network interface identification information received in operation 1013.

According to various embodiments, in operation 1017, the management module 611 may send a request for domain conversion to the domain conversion module 612. The domain conversion request may include the FQDN (e.g., "www.ccc.com") and/or network interface identification information (e.g., rmnet2) included in the updated rule 1014.

Meanwhile, the domain conversion request 716 may include information about DNS (e.g., 8.8.8.8). The domain conversion module 612 may query the DNS for the FQDN (e.g., "www.ccc.com") and may receive the corresponding IP address (e.g., 44.234.232.238) from DNS. As the domain conversion module 612 provides the IP address (e.g., 44.234.232.238) corresponding to the FQDN (e.g., "www.ccc.com") to the management module 611, in operation 1019, the management module 611 may obtain the IP address (e.g., 44.234.232.238).

According to various embodiments, in operation 1021, the management module 611 may update the previous rule 1014 to generate and/or manage an updated rule 1022. The updated rule 1022 may replace the IP address corresponding to the undecided FQDN marked with "?" in the previous rule 1014 with 44.234.232.238, which is the IP address received in operation 1019. The management module 611 may provide at least part 1024 of the rule 1022 (or association information between the network interface and IP address generated based on the rule 1022) to the route conversion module 613 in operation 1023. Although not shown, the route conversion module 613 may transmit and/or receive a packet associated with a specific IP address through a corresponding network interface based on at least part 1024 of the received rule 1022 (or association information between the IP address and the network interface). For example, the packet associated with the IP address of 172.217.175.14 may be transmitted/received through the network interface of rmnet1. For example, the packet associated with the IP address of 44.234.232.238 corresponding to "ccc.com" may be transmitted/received through the network interface of rmnet2.

Figure 11:
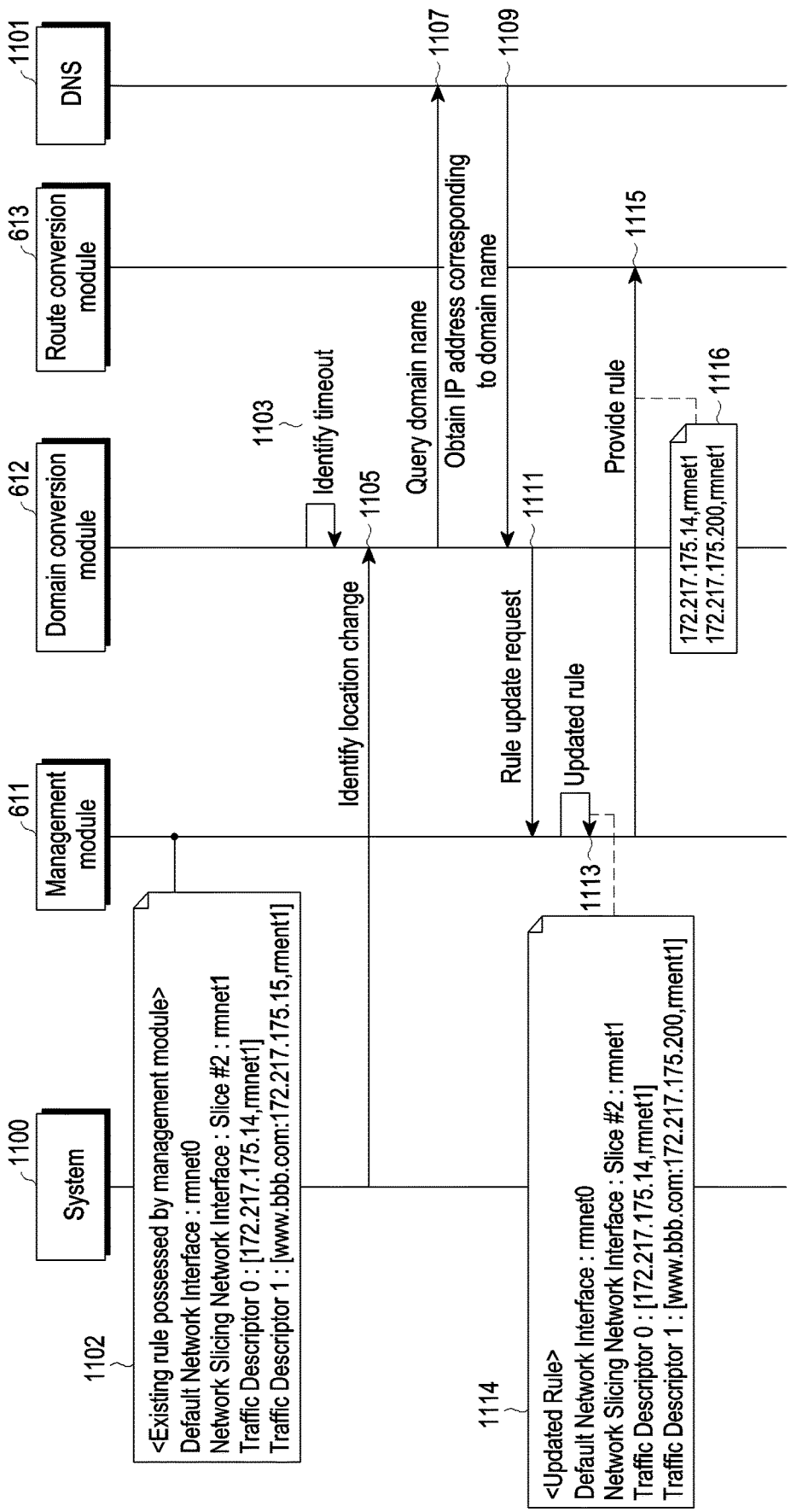
FIG. 11 is a signal flow diagram illustrating example operations of an electronic device according to various embodiments.

FIG. 11 is a signal flow diagram illustrating example operations of an electronic device according to various embodiments.

According to various embodiments, the management module 611 may previously store a rule 1102. For example, the rule 1102 in FIG. 11 may, for example, include the same information as the rule 900 in FIG. 9, and accordingly, a detailed description of the rule 1000 is not repeated. According to various embodiments, the domain conversion module 612 may identify a timeout in operation 1103. The domain conversion module 612 may be configured to re-query the IP address to DNS if the timeout when expiration of a designated time is identified is identified. The designated time may be, e.g., 60 minutes, but is not limited. In operation 1105, the domain conversion module 612 may receive identification of a location change from the system 1100. For example, the system 1100 may be at least part of an OS, but is not limited thereto. Upon identifying a location change of a designated distance (e.g., 50 km) or more from the point where the last IP address query was made, the system 1100 may be configured to notify the domain conversion module 612 of it. The domain conversion module 612 may perform a query of the domain name to the DNS 1101 again, in operation 1107, based on identifying a location change and/or timeout. The DNS 1101 may provide an IP address (e.g., 172.217.175.200) corresponding to the domain name in operation 1109, and the domain conversion module 612 may request the management module 611 to update the rule based on the received IP address (e.g., 172.217.175.200) in operation 1111. Meanwhile, it will be understood by one of ordinary skill in the art that the timeout and/or location change is merely an example, and there is no limitation on the trigger of a query of domain conversion.

According to various embodiments, in operation 1113, the management module 611 may update the existing rule 1102 to generate and/or manage an updated rule 1114. Referring to the updated rule 1114, as compared with the existing rule 1102, the IP address corresponding to "www.bbb.com" of the FQDN may be changed to the IP address, e.g., 172.217.175.200, received in operation 1111. The management module 611 may provide at least part 1116 of the rule 1114 (or association information between the network interface and IP address generated based on the rule 1114) to the route conversion module 613 in operation 1115. Although not shown, the route conversion module 613 may transmit and/or receive a packet associated with a specific IP address through a corresponding network interface based on at least part 1116 of the received rule 1114 (or association information between the IP address and the network interface). Accordingly, the packet associated with the updated IP address (e.g., 172.217.175.200) rather than the existing IP address (e.g., 172.217.175.15) corresponding to "www.bbb.com" may be transmitted/received through the network interface for network slicing.

Figure 12A:
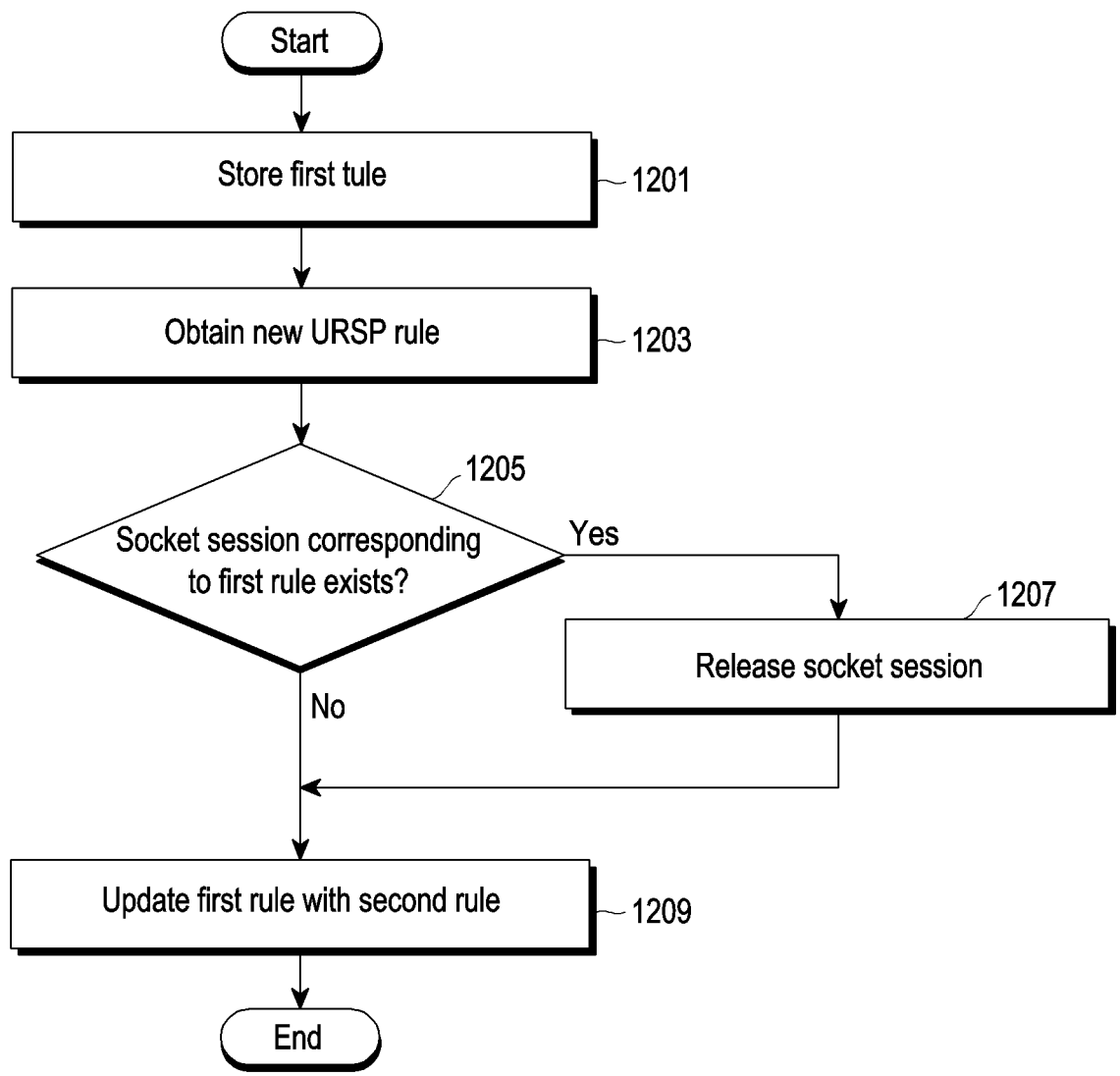
FIG. 12A is a flowchart illustrating example operations of an electronic device according to various embodiments.

FIG. 12A is a flowchart illustrating example operations of an electronic device according to various embodiments.

According to an embodiment, an electronic device 101 (e.g., at least one of the processor 120, the first communication processor 212, the second communication processor 214, the integrated communication processor 260, or the communication processor 440) may store a first rule in operation 1201. The first rule may include at least one IP address and/or at least one FQDN, and identification information about at least one corresponding network interface. In operation 1203, the electronic device 101 may obtain a new URSP rule. As described above, when the new URSP rule is obtained, the existing rule needs to be updated.

According to various embodiments, before updating the rule, the electronic device 101 may identify whether a socket session corresponding to the first rule exists in operation 1205. If there is a socket session corresponding to the first rule (Yes in 1205), the electronic device 101 may release the socket session corresponding to the first rule in operation 1207. The socket session management and/or release may be performed by the system (e.g., at least part of the OS) of the electronic device 101, but there is no limitation on the subject of the execution. If the socket session corresponding to the first rule does not exist (No in 1205) or after the socket session is released, in operation 1209, the electronic device 101 may update the first rule with the second rule based on the new URSP rule. Meanwhile, in addition to obtaining a new URSP rule, the electronic device 101 may update the rule even when the IP address corresponding to the FQDN is changed as shown in FIG. 11, and even in this case, may release the socket session corresponding to the existing rule before updating the rule. Meanwhile, in another example, the electronic device 101 may release the socket session corresponding to the existing rule after updating the rule.

Figure 12B:
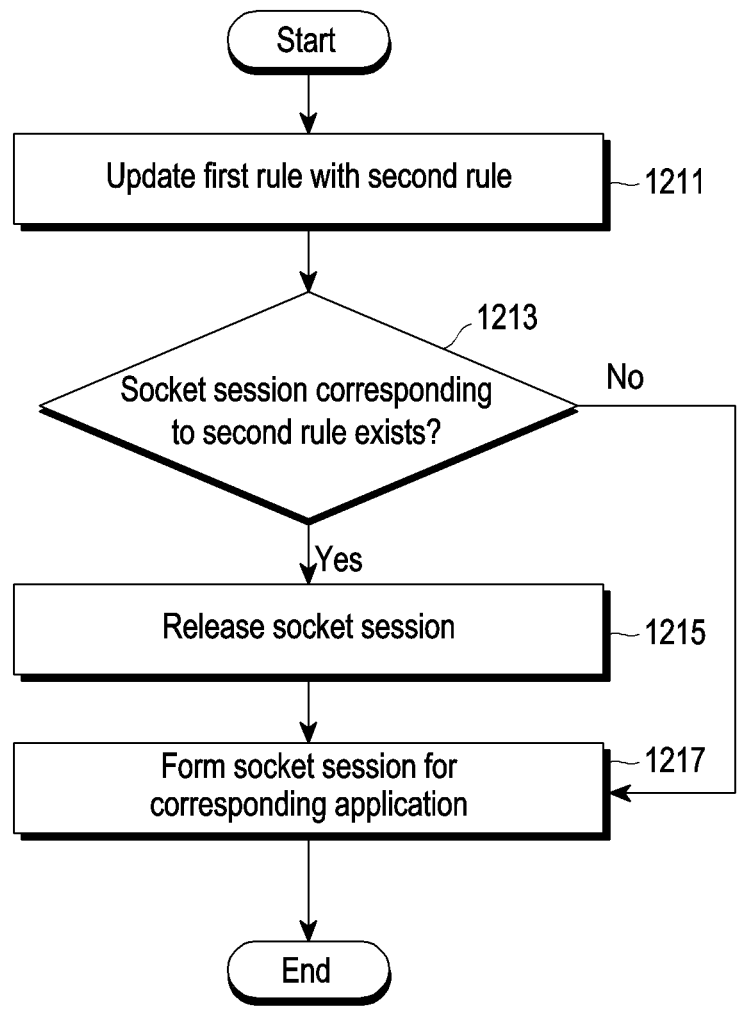
FIG. 12B is a flowchart illustrating example operations of an electronic device according to various embodiments.

FIG. 12B is a flowchart illustrating example operations of an electronic device according to various embodiments.

According to an embodiment, an electronic device 101 (e.g., at least one of the processor 120, the first communication processor 212, the second communication processor 214, the integrated communication processor 260, or the communication processor 440) may update the first rule with a second rule in operation 1211. For example, when obtaining a new URSP rule and/or an IP address corresponding to an FQDN is changed, the electronic device 101 may update the existing first rule with the second rule. In operation 1213, the electronic device 101 may determine whether a socket session corresponding to the second rule exists. If there is a socket session corresponding to the second rule (Yes in 1213), the electronic device 101 may release the socket session corresponding to the second rule in operation 1215. When the socket session corresponding to the second rule does not exist (No in 1213) or after releasing the socket session corresponding to the second rule, in operation 1217, the electronic device 101 may again form a socket session for the application. The detailed operation is described below.

Figure 13:
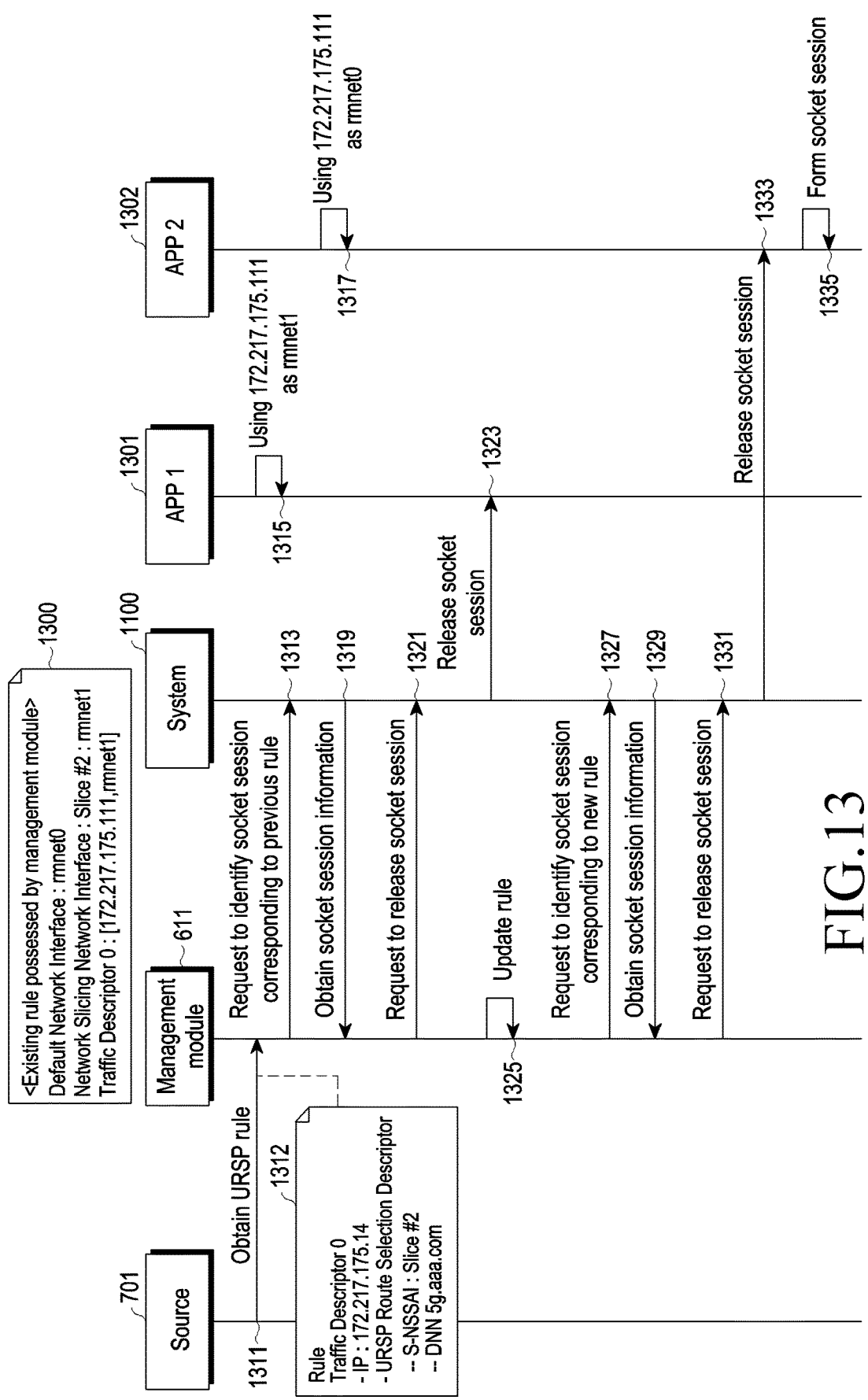
FIG. 13 is a signal flow diagram illustrating example operations of an electronic device according to various embodiments.

FIG. 13 is a signal flow diagram illustrating example operations of an electronic device according to various embodiments.

According to various embodiments, the management module 611 may previously store a rule 1300. For example, the rule 1300 in FIG. 13 may include information indicating that a network interface, rmnet1, to which network slicing is applied (network slicing network interface) is applied to "slice #2". The rule 1300 may include information indicating that traffic descriptor applied to "slice #2" is the first traffic descriptor (Traffic Descriptor 0). The first traffic descriptor (Traffic Descriptor 0) in the rule 1300 may include a first IP address (e.g., 172.217.175.111). Identification information about the network interface corresponding to the first traffic descriptor (Traffic Descriptor 0) may be rmnet1.

According to various embodiments, the management module 611 may obtain a new URSP rule 1312 from a source 701 in operation 1311. The new URSP rule 1312 may include the first traffic descriptor (Traffic Descriptor 0) and a route selection descriptor corresponding to the first traffic descriptor. The first traffic descriptor (Traffic Descriptor 0) may include a first IP address (e.g., 172.217.175.14), and the route selection descriptor corresponding thereto may include "slice #2" which is an S-NSSAI corresponding to "eMBB", and the DNN of "5g.aaa.com". Meanwhile, the information included in the new URSP rule 1312 is merely an example, and at least part thereof may be excluded, or additional information may be further included.

According to various embodiments, the management module 611 may request the system 1100 to identify the socket session corresponding to the previous rule 1300 before updating the URSP rule 1300 based on the new URSP rule 1312, in operation 1313. Meanwhile, the first application 1301 may be using 172.217.175.111 as rmnet1 in operation 1315, and the second application 1302 may be using 172.217.175.14 as rmnet0 in operation 1317. Each of the applications 1301 and 1032 may be connected with each corresponding network interface (rmnet1 and rmnet0) (e.g., through a TCP/UP stack) through a socket session.

According to various embodiments, the system 1100 may perform generation, release, and/or management of a socket session corresponding to each of the applications 1301 and 1302. Based on the request in operation 1313, the system 1100 may identify whether a socket session corresponding to the existing rule 1300 exists. For example, the existing rule 1300 may include an IP address (e.g., 172.217.175.111), and the system 1100 may identify that the IP address in the existing rule 1300 corresponds to the socket session of the first application. The system 1100 may provide information regarding the socket session corresponding to the existing rule 1300. The management module 611 may obtain socket session information in operation 1319. For example, the system 1100 may provide information about the socket session corresponding to the first application 1301 to the management module 611. It will be appreciated by one of ordinary skill in the art that it is not limited as long as it is information for identifying a socket session and may be replaced with, or add, information for identifying an application (e.g., the first application 1301) and/or a network interface (e.g., rmnet1).

According to various embodiments, the management module 611 may, in operation 1321, request the system 1100 to release the socket session corresponding to the existing rule 1300. For example, the management module 611 may request the system 1100 to release the socket session corresponding to the first application 1301. In operation 1323, the management module 611 may release the socket session corresponding to the first application 1301. Meanwhile, in another example, the management module 611 may request the system 1100 to immediately release the socket session corresponding to the existing rule 1300, instead of operation 1313. In this case, the system 1100 may immediately release the socket session corresponding to the existing rule 1300 even without providing socket session information, such as in operation 1319.

According to various embodiments, the management module 611 may, in operation 1325, update the existing rule 1300 based on the new URSP rule 1312. Although not shown, the updated rule may include information indicating that a network interface, rmnet1, to which network slicing is applied (network slicing network interface) is applied to "slice #2". The rule 1300 may include information indicating that traffic descriptor applied to "slice #2" is the first traffic descriptor (Traffic Descriptor 0). The first traffic descriptor (Traffic Descriptor 0) in the rule 1300 may include the IP address (e.g., 172.217.175.14) included in the new URSP rule 1312. Identification information about the network interface corresponding to the first traffic descriptor (Traffic Descriptor 0) may be rmnet1.

According to various embodiments, the management module 611 may request the system 1100 to identify a socket session corresponding to the new rule in operation 1327. For example, the management module 611 may request the system 1100 to identify whether a socket session corresponding to the IP address (e.g., 172.217.175.14) included in the rule exists. Based on the request, the system 1100 may identify whether a socket session corresponding to the IP address (e.g., 172.217.175.14) included in the rule exists. For example, the system 1100 may identify the IP address (e.g., 172.217.175.14) included in the rule as being used by the second application 1302. The system 1100 may provide information regarding the corresponding socket session of the second application 1302 to the management module 611. In operation 1329, the management module 611 may obtain socket session information from the system 1100. The management module 611 may request the system 1100 to release the corresponding socket session in operation 1331. The system 1100 may release the corresponding socket session based on the request in operation 1333. Meanwhile, in another example, the management module 611 may request the system 1100 to immediately release the socket session corresponding to the new rule, instead of operation 1327. In this case, the system 1100 may immediately release the socket session corresponding to the new rule 1300 even without providing socket session information, such as in operation 1329. If the route conversion module 613 provides the packet from the second application 1302 to rmnet1 even without releasing the socket session, the server may not normally recognize the packet in which the source IP address has been changed. Accordingly, the system 1100 may release the socket session corresponding to the second application 1302 and may re-establish the socket session. However, this is merely an example and in another example, the system 1100 may maintain and use the socket session corresponding to the second application 1302. According to various embodiments, in operation 1335, the second application 1302 may establish a new socket session. Further, when the packet transmitted by the second application 1302 includes the same destination IP address as the IP address (e.g., 172.217.175.14) included in the new rule, the route conversion module 613 may provide it to the network interface (e.g., rmnet1) corresponding to the new rule.

Figure 14:
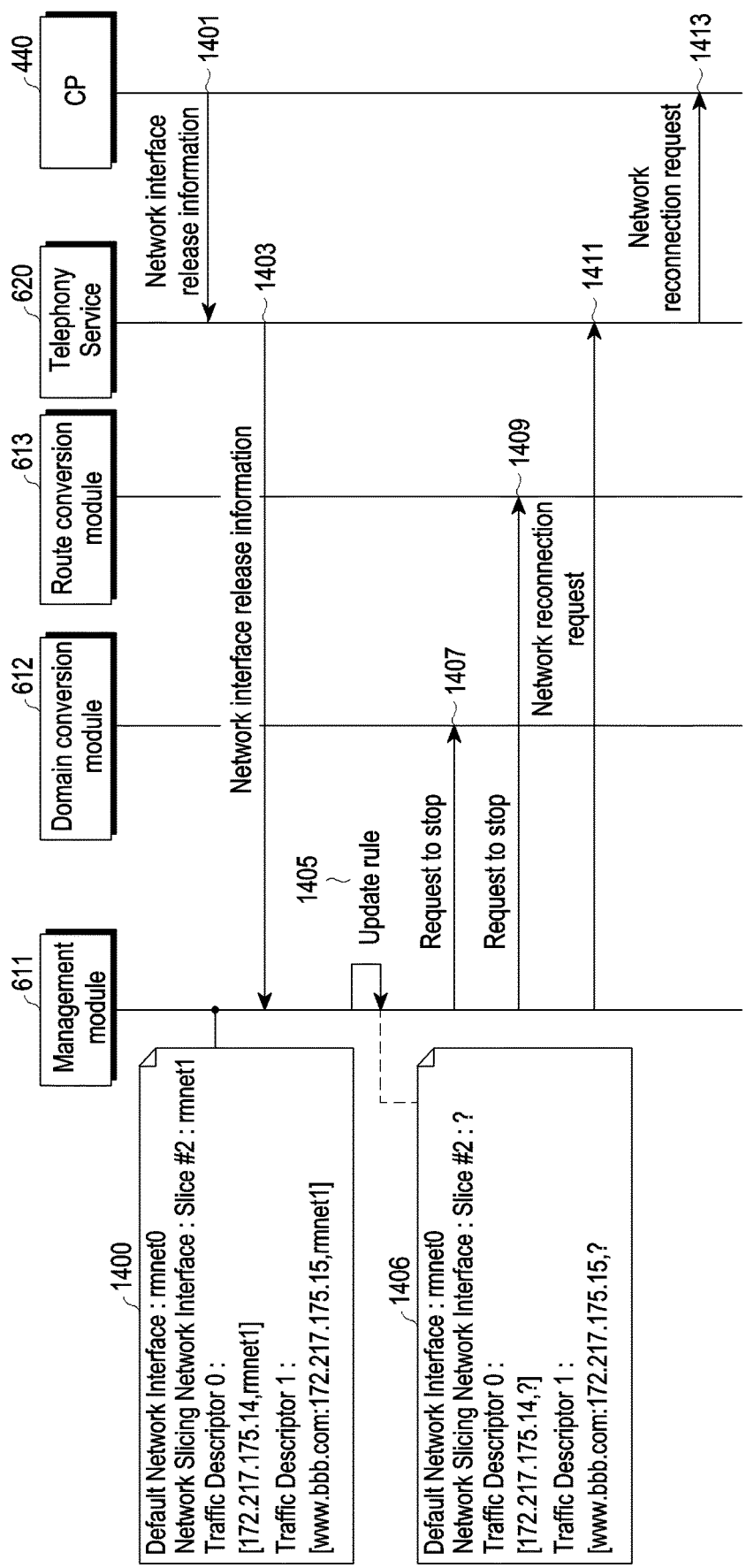
FIG. 14 is a signal flow diagram illustrating example operations of an electronic device according to various embodiments.

FIG. 14 is a signal flow diagram illustrating example operations of an electronic device according to various embodiments.

According to various embodiments, the management module 611 may previously store a rule 1400. For example, the rule 1400 in FIG. 14 may include information indicating that a network interface, rmnet1, to which network slicing is applied (network slicing network interface) is applied to "slice #2". The rule 900 may include information indicating that traffic descriptors applied to "slice #2" are the first traffic descriptor (Traffic Descriptor 0) and the second traffic descriptor (Traffic Descriptor 1). The first traffic descriptor (Traffic Descriptor 0) in the rule 1400 may include the first IP address (e.g., 172.217.175.14), and the second traffic descriptor (Traffic Descriptor 1) in the rule 1400 may include FQDN (e.g., "www.bbb.com") and the second IP address (e.g., 172.217.175.15). Identification information about the network interface corresponding to the first traffic descriptor (Traffic Descriptor 0) and the second traffic descriptor (Traffic Descriptor1) may be rmnet1.

According to various embodiments, the communication processor 440 may provide network interface release information to the TelephonyService 620 in operation 1401. For example, due to a temporary problem in the radio section, a network interface for network slicing may be released. For example, it is assumed that the network interface of rmnet1 is released. In operation 1403, the TelephonyService 620 may provide network interface release information to the management module 611.

According to various embodiments, in operation 1405, the management module 611 may update the existing rule 1400, obtaining an updated rule 1406. For example, when receiving information indicating that rmnet1 is released, the management module 611 may update the rule 1400 based on the information. As illustrated in FIG. 14, in the updated rule 1406, the network interface corresponding to the first traffic descriptor (Traffic Descriptor0) and the second traffic descriptor (Traffic Descriptor1) may be undecided and marked as "?". The management module 611 may request to stop the operation for the domain conversion module 612 in operation 1407. The management module 611 may request to stop the operation for the route conversion module 613 in operation 1409. The management module 611 may request the Telephony Service 620 to reconnect to the network in operation 1411. The Telephony Service 620 may request the communication processor 440 to reconnect to the network in operation 1413. For example, the management module 611 and/or the TelephonyService 620 may request network reconnection according to at least part of the route selection descriptor corresponding to the second traffic descriptor (Traffic Descriptor1).

Although not shown, the communication processor 440 may establish a PDU session based on a network reconnection request. The communication processor 440 may provide information about the network interface corresponding to the established session to the management module 611 through the TelephonyService 620. In this case, the management module 611 may update the existing rule 1406 using the received information about the network interface.

For example, the received network interface information may be reflected to the portion marked as "?" in the rule 1406 of FIG. 14.

Figure 15:
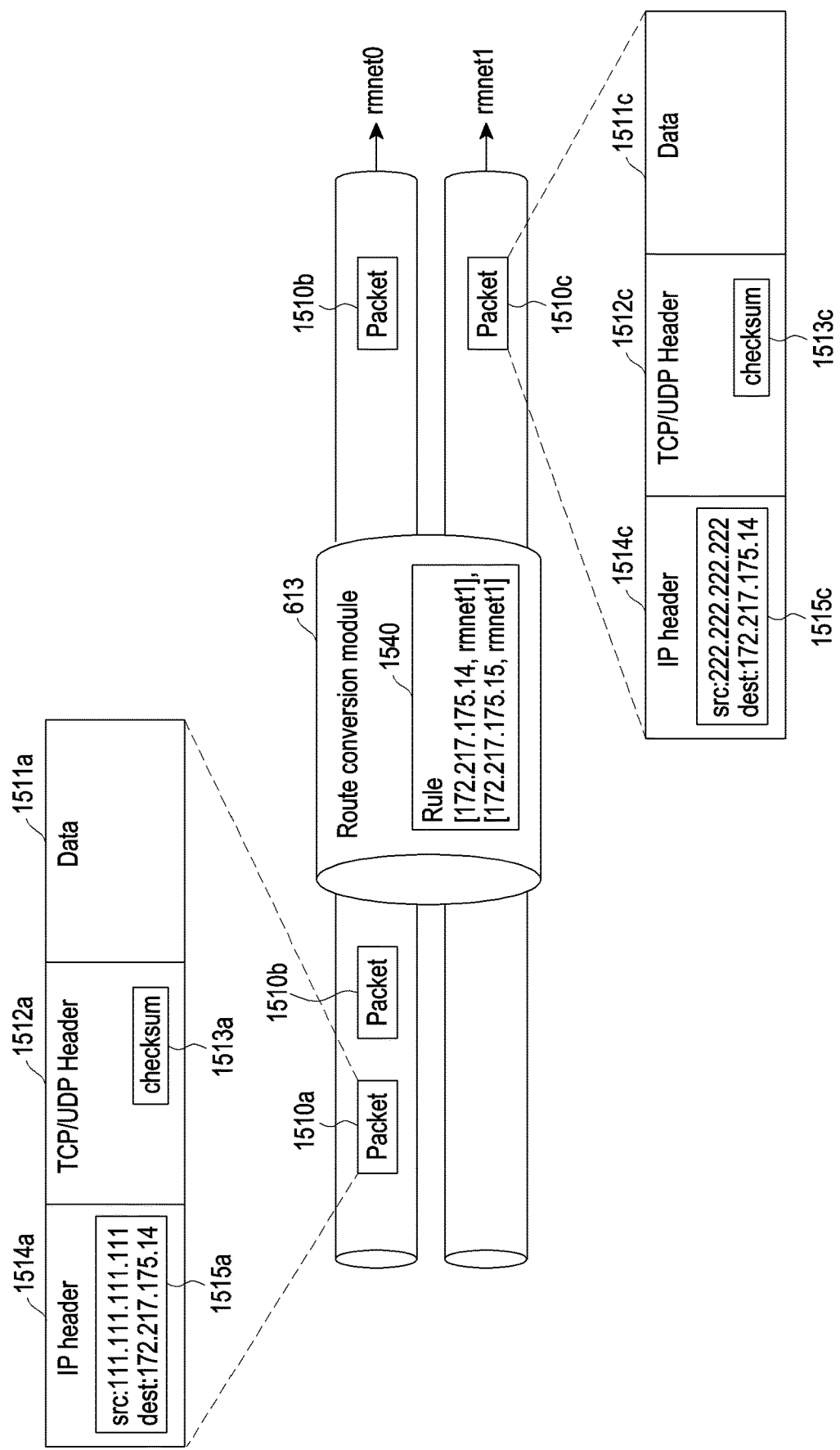
FIG. 15 is a diagram illustrating transmission of a packet according to various embodiments.

FIG. 15 is a diagram illustrating example transmission of a packet according to various embodiments.

According to various embodiments, the route conversion module 613 may receive, from the management module 611, association information 1540 between the network interface and the IP address and/or FQDN and manage it. For example, the association information 1540 in FIG. 15 may include information indicating that the IP address of 172.217.175.14 is associated with the network interface of rmnet1 and the IP address of 172.217.175.15 is associated with the network interface of rmnet1. Meanwhile, it is assumed that the IP address of 111.111.111.111 is assigned to rmnet0 and the IP address of 222.222.222.222 is assigned to rmnet1.

According to various embodiments, packets 1510a and 1510b may be provided from an application (not shown) to the route conversion module 613. For example, the packet 1510a may include transmission data 1511a, a TCP/UDP header 1512a, and/or an IP header 1514a. The TCP/UDP header 1512a may include a checksum 1513a. The IP header 1514a may include IP address information 1515a. The TP address information 1515a may include a source IP address (src) (e.g., 111.111.111.111) and a destination IP address (dest) (e.g., 172.217.175.14). For example, a default network interface corresponding to an application (not shown) may be set to rmnet0. Thus, the source IP address may be 111.111.111.111 assigned to rmnet0.

According to various embodiments, the route conversion module 613 may determine whether the destination IP address of the received packet for transmission corresponds to the IP address in the rule 1540. For example, the route conversion module 613 may identify that the destination IP address (e.g., 172.217.175.14) in the packet 1510a corresponds to 172.217.175.14, which is the IP address in the rule 1540. In this case, the route conversion module 613 may be configured to transmit a packet corresponding to the corresponding packet to the network interface (e.g., rmnet1) corresponding to 172.217.175.14.

For example, the route conversion module 613 may generate a corresponding new packet 1510c based on the packet 1510a for transmission being a route conversion target. The new packet 1510c may include transmission data 1511c, a TCP/UDP header 1512c, and/or an IP header 1514c. The TCP/UDP header 1512c may include a checksum 1513c. The IP header 1514c may include IP address information 1515c. The IP address information 1515c may include a source IP address (src) (e.g., 222.222.222.222) and a destination IP address (dest) (e.g., 172.217.175.14). For example, the route conversion module 613 may set the source IP address (src) to 222.222.222.222, which is the IP address allocated to rmnet1, as the new packet 1510c is to be provided through rmnet1. Meanwhile, the transmission data 1511c of the new packet 1510c may be equal to the transmission data 1510a of the existing packet 1510a. The checksum 1513c of the new packet 1510c may be different from the checksum 1513a of the existing packet 1510a. Meanwhile, both the packets 1510a and 1510c may have the same information in the TCP/UDP header except for the checksum.

In the example of FIG. 15, a packet 1510b may be provided from an application (not shown) to the route conversion module 613. Meanwhile, the destination IP address of the packet 1510b may not correspond to the IP address in the rule 1540. In this case, the route conversion module 613 may provide the packet 1510b to rmnet0 set as the default network interface. The route conversion module 613 may provide the received packet 1510b, as it is, to rmnet0.

As described above, when the packet for transmission provided from the application has a destination IP address corresponding to the rule 1540, it may be transmitted through a PDU session for network slicing. When the packet for transmission provided from the application does not have a destination IP address corresponding to the rule 1540, it may be transmitted through a PDU session other than the PDU session for network slicing.

Figure 16:
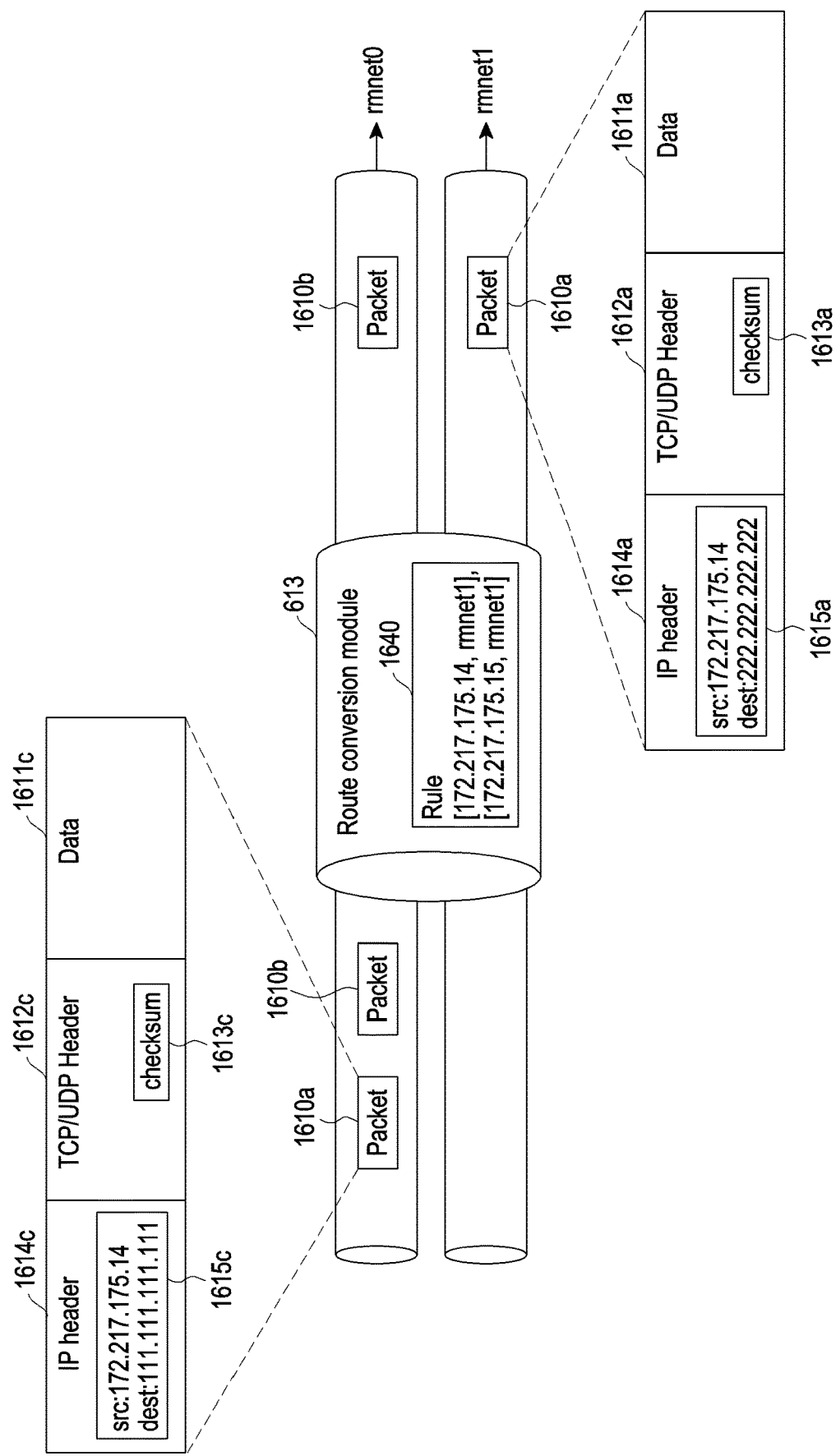
FIG. 16 is a diagram illustrating reception of a packet according to various embodiments.

FIG. 16 is a diagram illustrating example reception of a packet according to various embodiments.

According to various embodiments, the route conversion module 613 may receive, from the management module 611, association information 1640 between the network interface and the IP address and/or FQDN and manage it. For example, the association information 1640 in FIG. 15 may include information indicating that the IP address of 172.217.175.14 is associated with the network interface of rmnet1 and the IP address of 172.217.175.15 is associated with the network interface of rmnet1. Meanwhile, it is assumed that the IP address of 111.111.111.111 is assigned to rmnet0 and the IP address of 222.222.222.222 is assigned to rmnet1.

According to various embodiments, a packet 1610a for reception may be provided from rmnet1 to the route conversion module 1611. For example, the packet 1610a may include transmission data 1611a, a TCP/UDP header 1612a, and/or an IP header 1614a. The TCP/UDP header 1612a may include a checksum 1613a. The IP header 1614a may include IP address information 1615a. The IP address information 1615a may include a source IP address (src) (e.g., 172.217.175.14) and a destination IP address (dest) (e.g., 222.222.222.222). As the destination IP address is 222.222.222.222, the packet 1610a may be received through rmnet1.

According to various embodiments, the route conversion module 613 may determine whether the source IP address of the received packet for reception corresponds to the IP address in the rule 1640. For example, the route conversion module 613 may identify that the source IP address (e.g., 172.217.175.14) in the packet 1610a corresponds to 172.217.175.14, which is the IP address in the rule 1640. In this case, the route conversion module 613 may operate as if the corresponding packet was received through rment0.

For example, the route conversion module 613 may generate a corresponding new packet 1610c based on the packet 1610a for reception being a route conversion target. The new packet 1610c may include transmission data 1611c, a TCP/UDP header 1612c, and/or an IP header 1614c. The TCP/UDP header 1612c may include a checksum 1613c. The IP header 1614c may include IP address information 1615c. The IP address information 1615c may include a source IP address (src) (e.g., 172.217.175.14) and a destination IP address (dest) (e.g., 111.111.111.111). For example, the route conversion module 613 may set the destination IP address (dest) to I111.111.1.111, which is the IP address allocated to rmnet0, as if the new packet 1610 was received through rmnet0. Meanwhile, the transmission data 1611c of the new packet 1610c may be equal to the transmission data 1610a of the existing packet 1610a. The checksum 1613c of the new packet 1610c may be different from the checksum 1613a of the existing packet 1610a.

Meanwhile, both the packets 1610a and 1610c may have the same information in the TCP/UDP header except for the checksum.

In the example of FIG. 16, a packet 1610b may be provided from an application (not shown) to the route conversion module 613. Meanwhile, the source IP address of the packet 1610b may not correspond to the IP address in the rule 1640. In this case, the route conversion module 613 may provide the received packet 1610b as it is.

As described above, when the packet for reception provided from the application has a source IP address corresponding to the rule 1640, it may be processed as if it was received through the PDU session for network slicing. When the packet for transmission provided from the application does not have the source IP address corresponding to the rule 1640, it may be provided, as it is, to the application.

Figure 17A:
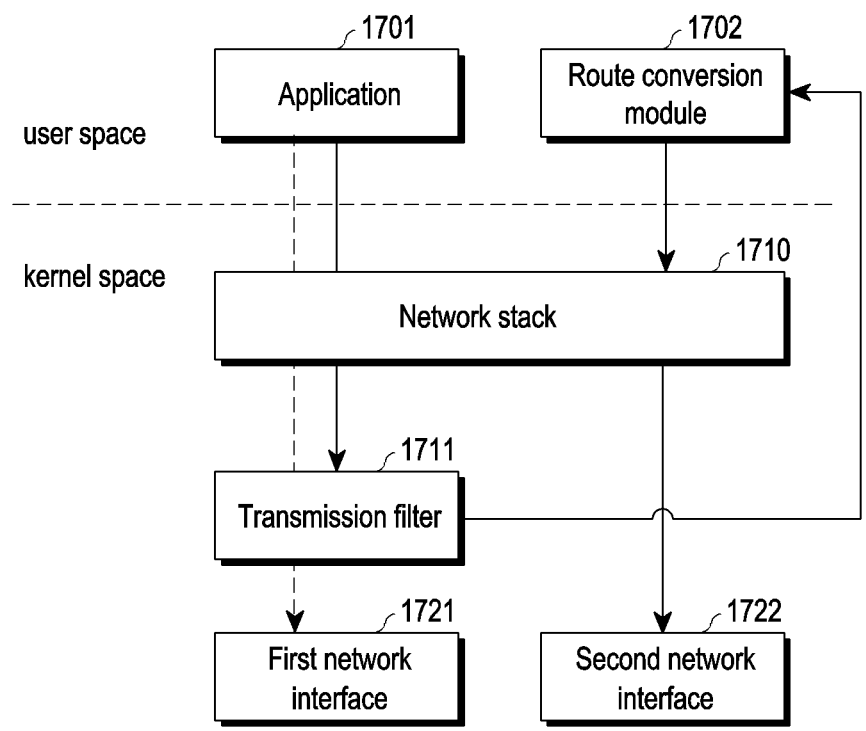
FIGS. 17A and 17B are diagrams illustrating packet transmission according to various embodiments.
Figure 17B:
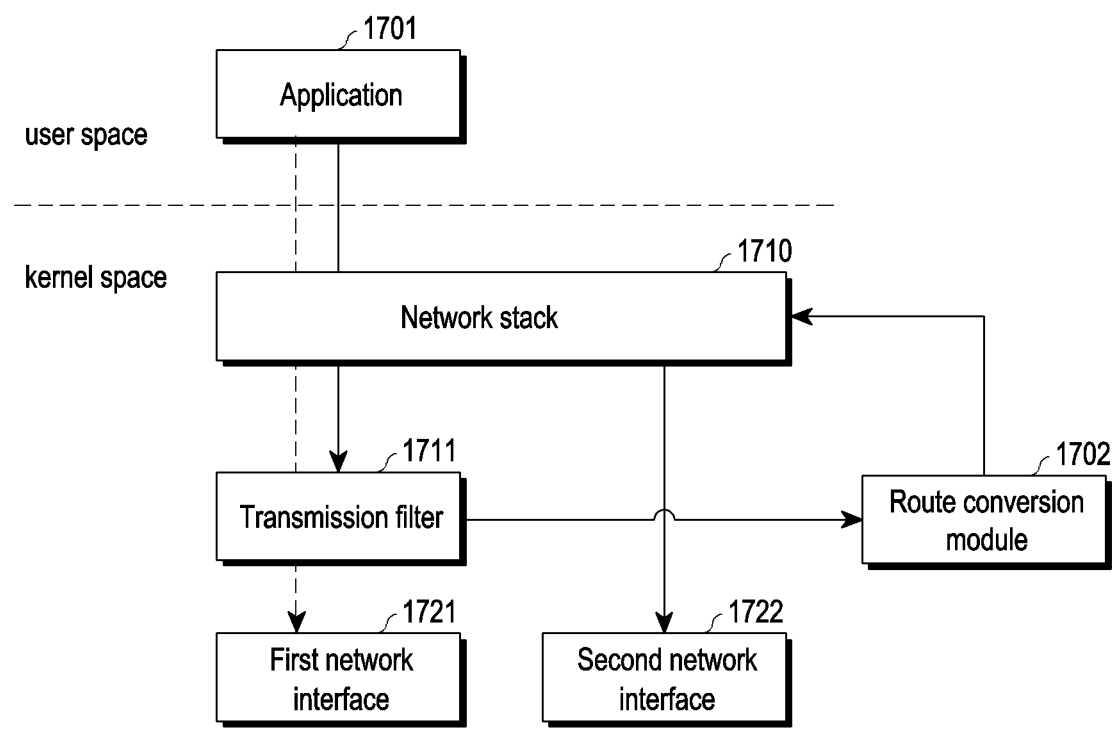

FIGS. 17A and 17B are diagrams illustrating example packet transmission according to various embodiments.

Referring to FIG. 17A, according to various embodiments, a kernel space and a user space may be defined in the OS of the electronic device 101. For example, the kernel space may be a space in which resources of the electronic device 101 may be directly controlled. The user space may be a space in which a general application program (or process) may be executed and/or controlled, but is not limited thereto. The user space may request system resources, for example, through the kernel space. In the kernel space, a network stack 1710, a transmission filter 1711, a first network interface 1721, and a second network interface 1722 may be executed and/or defined. The network stack 1710 may be, e.g., a TCP/IP stack, but is not limited thereto. In the user space, an application 1701 and/or a route conversion module 1702 may be executed and/or defined. In the example of FIG. 17A, it is assumed that the first network interface is a default network interface and the second network interface is a network interface configured for network slicing.

According to various embodiments, the transmission filter 1711 may be configured to filter a packet having a specific destination IP address among the input packets and provide it to the route conversion module 1702. The destination IP address for filtering by the transmission filter 1711 may be set to an IP address corresponding to the second network interface 1722 that is a network interface for network slicing. For example, according to a rule generated by the management module 611 and/or a rule shared with the route conversion module 1702, the IP address corresponding to the second network interface 1722 may be set to the destination IP address for filtering by the transmission filter 1711.

According to various embodiments, the packet (indicated by a dashed line) not filtered by the transmission filter 1711 may be provided to the first network interface 1721. Accordingly, packets may be transmitted through the first network interface 1721 through a PDU session irrelevant to network slicing. According to various embodiments, the packet (indicated by a solid line) filtered by the transmission filter 1711 may be provided to the route conversion module 1702. As described in connection with FIG. 15, the route conversion module 1702 and/or the network stack 1710 may generate a new packet corresponding to the received packet and provide it to the second network interface 1722 for network slicing. As described above, a packet having a specific destination IP address may be transmitted through the second network interface and through a PDU session for network slicing. As the route conversion module 1702 is executed in the user space, it may be implemented without restrictions due to the version of the kernel, and the difficulty of implementation may also be low.

Referring to FIG. 17B, according to various embodiments, the route conversion module 1702 may be executed in kernel space. Also in the embodiment of FIG. 17B, the transmission filter 1711 may be configured to filter a packet having a specific destination IP address among the input packets and provide it to the route conversion module 1702. According to various embodiments, the packet (indicated by a solid line) filtered by the transmission filter 1711 may be provided to the route conversion module 1702. As described in connection with FIG. 15, the route conversion module 1702 and/or the network stack 1710 may generate a new packet corresponding to the received packet and provide it to the second network interface 1722 for network slicing. As described above, a packet having a specific destination IP address may be transmitted through the second network interface and through a PDU session for network slicing. As the route conversion module 1702 is executed in the kernel space, the route conversion speed may be relatively high.

Figure 17C:
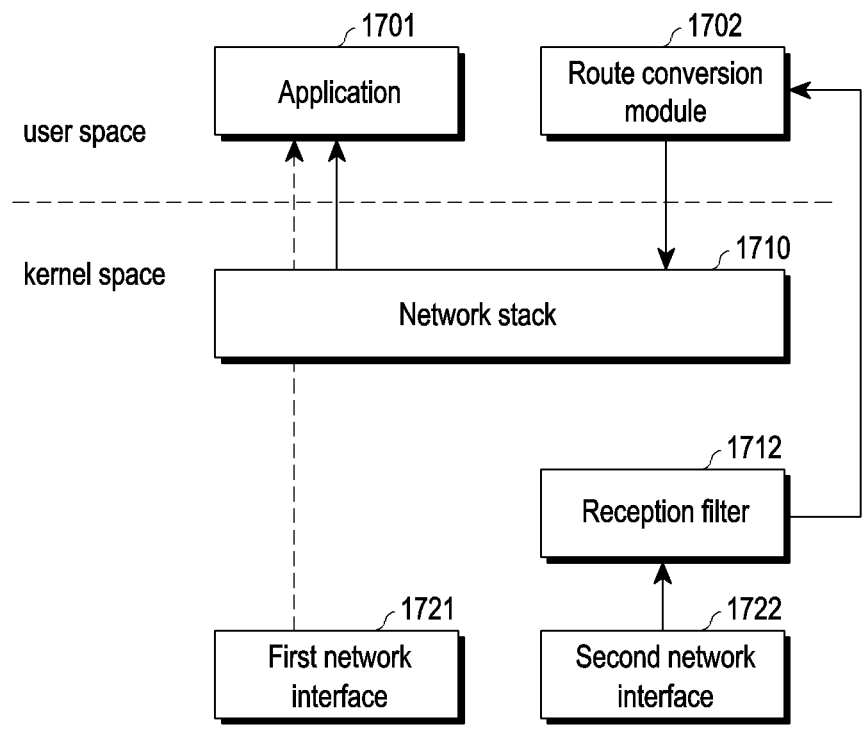
FIGS. 17C and 17D are diagrams illustrating packet reception according to various embodiments.
Figure 17D:
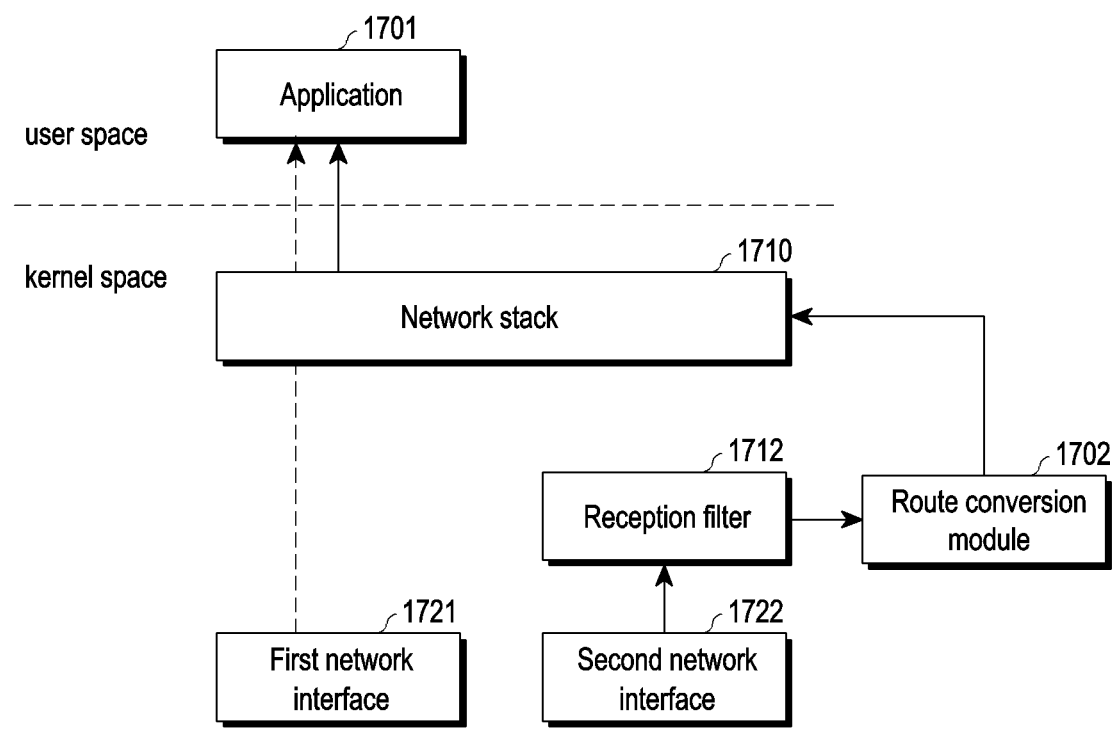

FIGS. 17C and 17D are diagrams illustrating example packet transmission according to various embodiments.

Referring to FIG. 17C, according to various embodiments, in the kernel space, a network stack 1710, a reception filter 1712, a first network interface 1721, and a second network interface 1722 may be executed and/or defined. In the user space, an application 1701 and/or a route conversion module 1702 may be executed and/or defined. In the example of FIG. 17C, it is assumed that the first network interface is a default network interface and the second network interface is a network interface configured for network slicing.

According to various embodiments, the reception filter 1712 may be configured to filter a packet having a specific source IP address among the input packets and provide it to the route conversion module 1702. The source IP address for filtering by the reception filter 1712 may be set to an IP address corresponding to the second network interface 1722 that is a network interface for network slicing. For example, according to a rule generated by the management module 611 and/or a rule shared with the route conversion module 1702, the IP address corresponding to the second network interface 1722 may be set to the destination IP address for filtering by the reception filter 1712.

According to various embodiments, the packet (indicated by a dashed line) not filtered by the reception filter 1712 may be provided from the first network interface 1721 to the application 1701 through the network interface 1710. According to various embodiments, the packet (indicated by a solid line) filtered by the reception filter 1712 may be provided to the route conversion module 1702. As described in connection with FIG. 16, the route conversion module 1702 and/or the network stack 1710 may generate a new packet corresponding to the received packet and provide it to the application 1701.

Referring to FIG. 17D, according to various embodiments, the route conversion module 1702 may be executed in kernel space. Also in the embodiment of FIG. 17D, the transmission filter 1711 may be configured to filter a packet having a specific source IP address among the input packets and provide it to the route conversion module 1702. According to various embodiments, the packet (indicated by a solid line) filtered by the reception tilter 1712 may be provided to the route conversion module 1702. As described in connection with FIG. 16, the route conversion module 1702 and/or the network stack 1710 may generate a new packet corresponding to the received packet and provide it to the application 1701.

Figure 18:
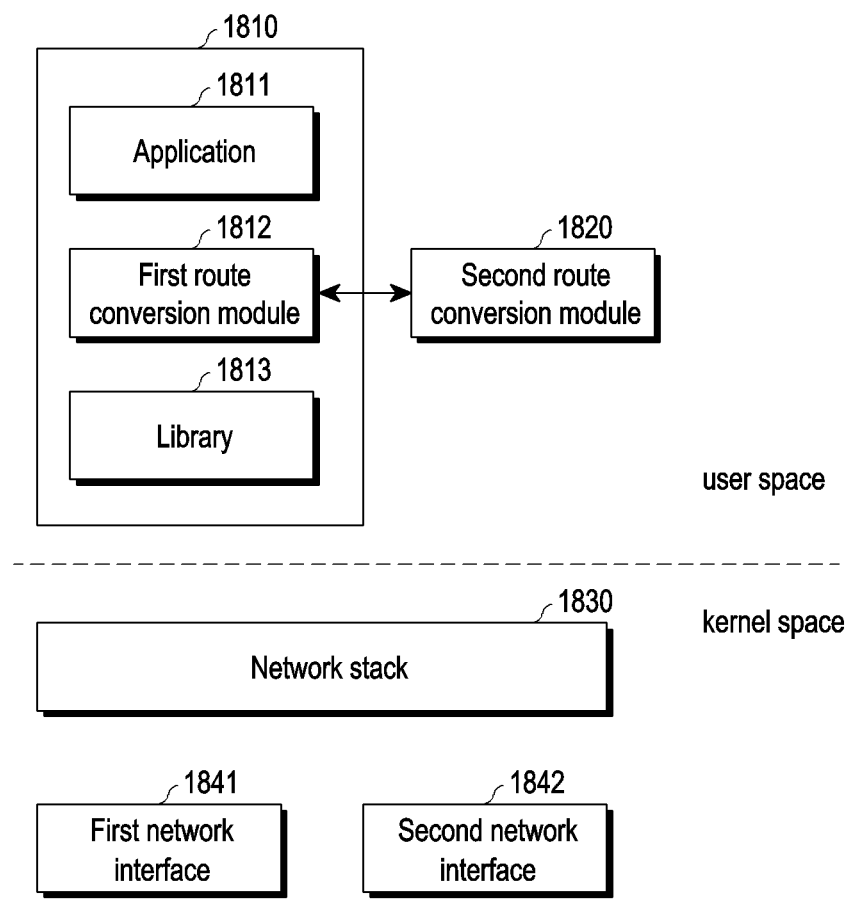
FIG. 18 is a diagram illustrating packet transmission according to various embodiments.

FIG. 18 is a diagram illustrating example packet transmission according to various embodiments.

According to various embodiments, a kernel space and a user space may be defined in the OS of the electronic device 101. In the kernel space, a network stack 1830, a first network interface 1841, and a second network interface 1842 may be executed and/or defined. The network stack 1830 may be, e.g., a TCP/IP stack, but is not limited thereto. In the user space, a process 1810 and/or a second route conversion module 1820 (e.g., corresponding to a process) may be executed and/or defined. In the example of FIG. 18, it is assumed that the first network interface is a default network interface and the second network interface is a network interface configured for network slicing.

According to various embodiments, the process 1810 may include at least one of an application 1811, a first route conversion module 1812, or a library 1813. The first route conversion module 1812 may hook a function invocation from the application 1811 to the library 1813. For example, when the application 1811 starts communication, functions (e.g., socket( ) function, connect( ) function, write function( )) in the library 1813 may be sequentially invoked.

When the application 1811 invokes the socket( ) function, the kernel may provide a file description (hereinafter, fd) that may communicate with the outside of the electronic device 101. As described above, a socket session corresponding to the application 1811 may be established. The application 1811 may invoke the connect( ) function by inputting fd, a destination IP address, and a port number. Accordingly, the socket session of the application 1811 may be connected with the socket session of an external server. The kernel may try to connect to the destination IP address and port number, using the network interface designated in fd and may provide a result of the connection. Thereafter, the application 1801 may transmit data to the external server by inputting fd and data to the write( ) function.

According to various embodiments, fd in the connect( ) function of the application 1811 may include a default network interface (e.g., rmnet0). The first route conversion module 1812 may hook invocation of the connect( ) function and may change the default network interface of fd (e.g., rment0) to the network interface for network slicing (rmnet1). For example, the first route conversion module 1812 may inquire the second route conversion module 1820, which is executed independently from the process 1810, whether fd is changed. The second route conversion module 1820 may notify the first route conversion module 1812 to change fd to rment1, e.g., when the destination IP address corresponds to the IP address included in the rule for network slicing. The first route conversion module 1812 may change rmnet0 in fd to rmnet1 based on information from the second route conversion module 1820. For example, the first route conversion module 1812 and the second route conversion module 1820 may be implemented in a server-client structure, but this is example data. The data transmission/reception scheme between the route conversion modules 1812 and 1820 is not limited to a specific one. Further, implementing the first route conversion module 1812 and the second route conversion module 1820 as two entities is also an example. In other embodiments, the route conversion module may also be implemented as a single entity that may hook function invocation from the application 1811, determine whether to change the content of fd therefor, and change the content of fd. As described above, a socket connection to rmnet1 may be performed for a specific destination IP address, and subsequent data transmission/reception to the corresponding destination IP address may be performed through rmnet1. Meanwhile, although the hooking of the connect( ) function has been described above, the functions of the hooking target are not limited.

According to various example embodiments, an electronic device may comprise at least one processor (e.g., the processor 120) and at least one communication processor (e.g., at least one of the first communication processor 212, the second communication processor 214, the integrated communication processor 260, or the communication processor 440). The at least one processor may be configured to: obtain a URSP rule including a first traffic descriptor including a first IP address and a first route selection descriptor corresponding to the first traffic descriptor, request the at least one communication processor to establish a first PDU session corresponding to the first route selection descriptor, the at least one communication processor may be configured to: establish the first PDU session corresponding to the first route selection descriptor in response to the request to establish the first PDU session, a first network interface corresponding to the first PDU session established between the at least one communication processor and the at least one processor, wherein the at least one processor may be further configured to: identify transmission data from an application executed by the at least one processor, request the at least one communication processor to transmit a first transmission packet including a first source IP address corresponding to the first network interface and the transmission data, through the first network interface, based on a destination IP address corresponding to the transmission data corresponding to the first IP address, and request the at least one communication processor to transmit a second transmission packet including a second source IP address corresponding to a second network interface, different from the first network interface, and the transmission data, through the second network interface, based on the destination IP address corresponding to the transmission data not corresponding to the first IP address.

According to various example embodiments, the at least one processor may be configured to, as at least part of identifying the transmission data of the application executed by the at least one processor: obtain a third transmission packet including the transmission data, a first TCP header, and a first IP header from the application.

According to various example embodiments, the at least one processor may be configured to, as at least part of requesting the at least one communication processor to transmit the first transmission packet including the first source IP address corresponding to the first network interface and the transmission data, through the first network interface, based on the destination IP address corresponding to the transmission data corresponding to the first IP address: identify that a destination IP address included in the first IP header of the third transmission packet corresponds to the first IP address, generate the first transmission packet including the transmission data, a second TCP header at least partially different from the first TCP header, and a second IP header, the second IP header including the first source IP address corresponding to the first network interface and the first destination IP address, and request the at least one communication processor to transmit the first transmission packet, instead of the third transmission packet, through the first network interface.

According to various example embodiments, the second source IP address corresponding to the second network interface included in the third transmission packet may differ from the first source IP address corresponding to the first network interface included in the first transmission packet.

According to various example embodiments, a checksum of the first TCP header of the third transmission packet may differ from a checksum of the second TCP header of the first transmission packet.

According to various example embodiments, the at least one processor may be configured to, as at least part of identifying whether the destination IP address included in the first IP header of the third transmission packet corresponds to the first IP address: identify that a destination IP address included in the IP header of the third transmission packet corresponds to the first IP address using a transmission filter configured between a network stack outputting the third transmission packet and the first network interface.

According to various example embodiments, the at least one processor may be configured to, as at least part of identifying the transmission data of the application executed by the at least one processor: obtain the second transmission packet including the transmission data, a third TCP header, and a third IP header. The at least one processor may be configured to, as requesting the at least one communication processor to transmit the second transmission packet including the second source IP address corresponding to the second network interface, different from the first network interface, and the transmission data, through the second network interface, based on the destination IP address corresponding to the transmission data not corresponding to the first IP address: identify that a destination IP address included in the third IP header of the second transmission packet does not correspond to the first IP address, and request the at least one communication processor to transmit the second transmission packet through the second network interface.

According to various example embodiments, the at least one processor may be configured to, as at least part of requesting the at least one communication processor to transmit the first transmission packet including the first source IP address corresponding to the first network interface and the transmission data, through the first network interface, based on the destination IP address corresponding to the transmission data corresponding to the first IP address: hook a function invocation from the application, and replace the second network interface included in a file descriptor included in the function invocation with the first network interface, based on a destination IP address included in the hooked function invocation corresponding to the first IP address.

According to various example embodiments, the at least one processor may be configured to: receive a first reception packet through the first network interface, the first reception packet including a fourth IP header, a fourth TCP header, and reception data, provide a second reception packet corresponding to the first reception packet to the application, based on a source IP address of the first reception packet corresponding to the first IP address, and provide the first reception packet to the application, based on the source IP address of the first reception packet not corresponding to the first IP address.

According to various example embodiments, the at least one processor may be configured to, as at least part of providing the second reception packet corresponding to the first reception packet to the application, based on the source IP address of the first reception packet corresponding to the first IP address: identify that a source IP address included in the fourth IP header corresponds to the first IP address, generate the second reception packet including the reception data, a fifth TCP header at least partially different from the fourth TCP header, and a fifth IP header, the fifth IP header including a destination IP address identical to the second source IP address corresponding to the second network interface, and provide the second reception packet, instead of the first reception packet, to the application.

According to various example embodiments, a destination IP address corresponding to the first source IP address corresponding to the first network interface included in the first reception packet may differ from a destination IP address corresponding to the second source IP address corresponding to the second network interface.

According to various example embodiments, a checksum of the fourth TCP header of the first reception packet may differ from a checksum of the fifth TCP header of the second reception packet.

According to various example embodiments, the at least one processor may be configured to: obtain a URSP rule including a second traffic descriptor including a first domain name and a second route selection descriptor corresponding to the second traffic descriptor, request the at least one communication processor to establish a second PDU session corresponding to the second route selection descriptor, the at least one communication processor configured to: establish the second PDU session corresponding to the second route selection descriptor in response to the request to establish the second PDU session, a third network interface corresponding to the second PDU session established between the at least one communication processor and the at least one processor, obtain a second IP address corresponding to the first domain name, identify other transmission data from an application executed by the at least one processor, wherein the at least one processor is further configured to: request the at least one communication processor to transmit a fourth transmission packet including a third source IP address corresponding to the third network interface and the transmission data, through the third network interface, based on a destination IP address corresponding to the other transmission data corresponding to the second IP address, and request the at least one communication processor to transmit a fifth transmission packet including the second source IP address and the other transmission data, through the second network interface, based on the destination IP address corresponding to the other transmission data not corresponding to the second IP address.

According to various example embodiments, the at least one processor may be configured to update the second IP address corresponding to the domain name, based on identifying an event for a query about the domain name.

According to various example embodiments, the at least one processor may be configured to: obtain a new URSP rule different from the URSP rule, and update the first IP address, based on the new URSP rule.

According to various example embodiments, the at least one processor may be configured to: release at least one socket session associated with the first IP address before updating the first IP address and/or releasing and then re-forming the socket session associated with the updated first IP address after updating the first IP address.

According to various example embodiments, a method for operating an electronic device including at least one processor and at least one communication processor may comprise: obtaining, by the at least one processor, a URSP rule including a first traffic descriptor including a first IP address and a first route selection descriptor corresponding to the first traffic descriptor, requesting, by the at least one processor, the at least one communication processor to establish a first PDU session corresponding to the first route selection descriptor, establishing, by the at least one communication processor, the first PDU session corresponding to the first route selection descriptor in response to the request to establish the first PDU session, and a first network interface corresponding to the first PDU session established between the at least one communication processor and the at least one processor, identifying, by the at least one processor, transmission data from an application executed by the at least one processor, requesting, by the at least one processor, the at least one communication processor to transmit a first transmission packet including a first source IP address corresponding to the first network interface and the transmission data, through the first network interface, based on a destination IP address corresponding to the transmission data corresponding to the first IP address, and requesting, by the at least one processor, the at least one communication processor to transmit a second transmission packet including a second source IP address corresponding to a second network interface, different from the first network interface, and the transmission data, through the second network interface, based on the destination IP address corresponding to the transmission data not corresponding to the first IP address.

According to various example embodiments, the method may further comprise: receiving, by the at least one processor, a first reception packet through the first network interface, the first reception packet including a fourth IP header, a fourth TCP header, and reception data, providing, by the at least one processor, a second reception packet corresponding to the first reception packet to the application, based on a source IP address of the first reception packet corresponding to the first IP address, and providing, by the at least one processor, the first reception packet to the application, based on the source IP address of the first reception packet not corresponding to the first IP address.

According to various example embodiments, the method may further comprise obtaining, by the at least one processor, a URSP rule including a second traffic descriptor including a first domain name and a second route selection descriptor corresponding to the second traffic descriptor, requesting, by the at least one processor, the at least one communication processor to establish a second PDU session corresponding to the second route selection descriptor, establishing, by the at least one communication processor, the second PDU session corresponding to the second route selection descriptor in response to the request to establish the second PDU session, a third network interface corresponding to the second PDU session established between the at least one communication processor and the at least one processor, obtaining, by the at least one processor, a second IP address corresponding to the first domain name, identifying, by the at least one processor, other transmission data from an application executed by the at least one processor, requesting, by the at least one processor, the at least one communication processor to transmit a fourth transmission packet including a third source IP address corresponding to the third network interface and the transmission data, through the third network interface, based on a destination IP address corresponding to the other transmission data corresponding to the second IP address, and requesting, by the at least one processor, the at least one communication processor to transmit a fifth transmission packet including the second source IP address and the other transmission data, through the second network interface, based on the destination IP address corresponding to the other transmission data not corresponding to the second IP address.

According to various example embodiments, the method may further comprise obtaining, by the at least one processor, a new URSP rule different from the URSP rule, and updating, by the at least one processor, the first IP address, based on the new URSP rule.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A. B. or C," "at least one of A, B, and C." and "at least one of A, B, or C." may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with." "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising,
at least one processor, and
at least one communication processor,
wherein the at least one processor is configured to:
obtain a user equipment (UE) route selection policy (URSP) rule including a first traffic descriptor including a first TP address and a first route selection descriptor corresponding to the first traffic descriptor,
request the at least one communication processor to establish a first protocol data unit (PDU) session corresponding to the first route selection descriptor, the at least one communication processor configured to:
establish the first PDU session corresponding to the first route selection descriptor in response to the request to establish the first PDU session, and a first network interface corresponding to the first PDU session being established between the at least one communication processor and the at least one processor, wherein the at least one processor is further configured to:
identify transmission data from an application executed by the at least one processor, request the at least one communication processor to transmit a first transmission packet including a first source IP address corresponding to the first network interface and the transmission data, through the first network interface, based on a destination IP address corresponding to the transmission data corresponding to the first IP address, and request the at least one communication processor to transmit a second transmission packet including a second source IP address corresponding to a second network interface, different from the first network interface, and the transmission data, through the second network interface, based on the destination IP address corresponding to the transmission data not corresponding to the first IP address.

2. The electronic device of claim 1, wherein the at least one processor is configured to, as at least part of identifying the transmission data of the application executed by the at least one processor:
obtain a third transmission packet including the transmission data, a first TCP header, and a first IP header from the application.

3. The electronic device of claim 2, wherein the at least one processor is configured to, as at least part of requesting the at least one communication processor to transmit the first transmission packet including the first source IP address corresponding to the first network interface and the transmission data, through the first network interface, based on the destination IP address corresponding to the transmission data corresponding to the first IP address:
identify that a destination IP address included in the first IP header of the third transmission packet corresponds to the first IP address,
generate the first transmission packet including the transmission data, a second TCP header at least partially different from the first TCP header, and a second IP header, the second IP header including the first source IP address corresponding to the first network interface and the first destination IP address, and
request the at least one communication processor to transmit the first transmission packet, instead of the third transmission packet, through the first network interface.

4. The electronic device of claim 3, wherein the second source IP address corresponding to the second network interface included in the third transmission packet differs from the first source IP address corresponding to the first network interface included in the first transmission packet.

5. The electronic device of claim 3, wherein a checksum of the first TCP header of the third transmission packet differs from a checksum of the second TCP header of the first transmission packet.

6. The electronic device of claim 3, wherein the at least one processor is configured to, as identifying whether the destination IP address included in the first IP header of the third transmission packet corresponds to the first IP address:
identify that a destination IP address included in the IP header of the third transmission packet corresponds to the first IP address using a transmission filter configured between a network stack outputting the third transmission packet and the first network interface.

7. The electronic device of claim 2, wherein the at least one processor is configured to, as at least part of identifying the transmission data of the application executed by the at least one processor: obtain the second transmission packet including the transmission data, a third TCP header, and a third IP header, and wherein the at least one processor is configured to, as requesting the at least one communication processor to transmit the second transmission packet including the second source IP address corresponding to the second network interface, different from the first network interface, and the transmission data, through the second network interface, based on the destination IP address corresponding to the transmission data not corresponding to the first IP address:
identify that a destination IP address included in the third IP header of the second transmission packet does not correspond to the first IP address, and
request the at least one communication processor to transmit the second transmission packet through the second network interface.

8. The electronic device of claim 1, wherein the at least one processor is configured to, as at least part of requesting the at least one communication processor to transmit the first transmission packet including the first source IP address corresponding to the first network interface and the transmission data, through the first network interface, based on the destination IP address corresponding to the transmission data corresponding to the first IP address:
hook a function invocation from the application, and
replace the second network interface included in a file descriptor included in the function invocation with the first network interface based on a destination IP address included in the hooked function invocation corresponding to the first IP address.

9. The electronic device of claim 1, wherein the at least one processor is configured to:
receive a first reception packet through the first network interface, the first reception packet including a fourth IP header, a fourth TCP header, and reception data,
provide a second reception packet corresponding to the first reception packet to the application based on a source IP address of the first reception packet corresponding to the first IP address, and
provide the first reception packet to the application based on the source IP address of the first reception packet not corresponding to the first IP address.

10. The electronic device of claim 9, wherein the at least one processor is configured to, as providing the second reception packet corresponding to the first reception packet to the application based on the source IP address of the first reception packet corresponding to the first IP address:
identify that a source IP address included in the fourth IP header corresponds to the first IP address,
generate the second reception packet including the reception data, a fifth TCP header at least partially different from the fourth TCP header, and a fifth IP header, the fifth IP header including a destination IP address identical to the second source IP address corresponding to the second network interface, and
provide the second reception packet, instead of the first reception packet, to the application.

11. The electronic device of claim 10, wherein a destination IP address corresponding to the first source IP address corresponding to the first network interface included in the first reception packet differs from a destination IP address corresponding to the second source IP address corresponding to the second network interface.

12. The electronic device of claim 10, wherein a checksum of the fourth TCP header of the first reception packet differs from a checksum of the fifth TCP header of the second reception packet.

13. The electronic device of claim 1, wherein the at least one processor is configured to:
obtain a URSP rule including a second traffic descriptor including a first domain name and a second route selection descriptor corresponding to the second traffic descriptor,
request the at least one communication processor to establish a second PDU session corresponding to the second route selection descriptor, the at least one communication processor being configured to: establish the second PDU session corresponding to the second route selection descriptor in response to the request to establish the second PDU session, a third network interface corresponding to the second PDU session being established between the at least one communication processor and the at least one processor,
the at least one processor further configured to: obtain a second IP address corresponding to the first domain name,
identify other transmission data from an application executed by the at least one processor,
request the at least one communication processor to transmit a fourth transmission packet including a third source IP address corresponding to the third network interface and the transmission data, through the third network interface, based on a destination IP address corresponding to the other transmission data corresponding to the second IP address, and
request the at least one communication processor to transmit a fifth transmission packet including the second source IP address and the other transmission data, through the second network interface, based on the destination IP address corresponding to the other transmission data not corresponding to the second IP address.

14. The electronic device of claim 13, wherein the at least one processor is configured to: update the second IP address corresponding to the domain name based on identifying an event for a query about the domain name.

15. The electronic device of claim 1, wherein the at least one processor is configured to,
obtain a new URSP rule different from the URSP rule, and update the first IP address based on the new URSP rule.

16. The electronic device of claim 15, wherein the at least one processor is configured to: release at least one socket session associated with the first IP address before updating the first IP address and/or releasing and then re-forming the socket session associated with the updated first IP address after updating the first IP address.

17. A method for operating an electronic device including at least one processor and at least one communication processor, the method comprising,
obtaining, by the at least one processor, a user equipment (UE) route selection policy (URSP) rule including a first traffic descriptor including a first IP address and a first route selection descriptor corresponding to the first traffic descriptor,
requesting, by the at least one processor, the at least one communication processor to establish a first PDU session corresponding to the first route selection descriptor,
establishing, by the at least one communication processor, the first PDU session corresponding to the first route selection descriptor in response to the request to establish the first PDU session, a first network interface corresponding to the first PDU session being established between the at least one communication processor and the at least one processor;
identifying, by the at least one processor, transmission data from an application executed by the at least one processor,
requesting, by the at least one processor, the at least one communication processor to transmit a first transmission packet including a first source IP address corresponding to the first network interface and the transmission data, through the first network interface, based on a destination IP address corresponding to the transmission data corresponding to the first IP address; and
requesting, by the at least one processor, the at least one communication processor to transmit a second transmission packet including a second source IP address corresponding to a second network interface, different from the first network interface, and the transmission data, through the second network interface, based on the destination IP address corresponding to the transmission data not corresponding to the first IP address.

18. The method of claim 17, further comprising,
receiving, by the at least one processor, a first reception packet through the first network interface, the first reception packet including a fourth IP header, a fourth TCP header, and reception data;
providing, by the at least one processor, a second reception packet corresponding to the first reception packet to the application, based on a source IP address of the first reception packet corresponding to the first IP address, and
providing, by the at least one processor, the first reception packet to the application, based on the source IP address of the first reception packet not corresponding to the first IP address.

19. The method of claim 17, further comprising,
obtaining, by the at least one processor, a URSP rule including a second traffic descriptor including a first domain name and a second route selection descriptor corresponding to the second traffic descriptor,
requesting, by the at least one processor, the at least one communication processor to establish a second PDU session corresponding to the second route selection descriptor;
establishing, by the at least one communication processor, the second PDU session corresponding to the second route selection descriptor in response to the request to establish the second PDU session, a third network interface corresponding to the second PDU session established between the at least one communication processor and the at least one processor,
obtaining, by the at least one processor, a second IP address corresponding to the first domain name;
identifying, by the at least one processor, other transmission data from an application executed by the at least one processor;
requesting, by the at least one processor, the at least one communication processor to transmit a fourth transmission packet including a third source IP address corresponding to the third network interface and the transmission data, through the third network interface, based on a destination IP address corresponding to the other transmission data corresponding to the second IP address, and requesting, by the at least one processor, the at least one communication processor to transmit a fifth transmission packet including the second source IP address and the other transmission data, through the second network interface, based on the destination IP address corresponding to the other transmission data not corresponding to the second IP address.

20. The method of claim 17, further comprising, obtaining, by the at least one processor, a new URSP rule different from the URSP rule, and updating, by the at least one processor, the first IP address, based on the new URSP rule.

\* \* \* \* \*